US012575699B2

(12) United States Patent
Lovering et al.

(10) Patent No.: US 12,575,699 B2
(45) Date of Patent: Mar. 17, 2026

(54) PORTABLE BLENDER SYSTEM

(71) Applicant: All Terrain Appliances, Inc.,
Clarksburg, CA (US)

(72) Inventors: Thomas W. Lovering, Clarksburg, CA
(US); Andrew Rojee, Derry, NH (US);
Josue Ricardo Campos, New Haven,
CT (US)

(*) Notice: Subject to any disclaimer, the term of this
patent is extended or adjusted under 35
U.S.C. 154(b) by 6 days.

(21) Appl. No.: 19/021,967

(22) Filed: Jan. 15, 2025

(65) Prior Publication Data

US 2025/0228404 A1       Jul. 17, 2025

Related U.S. Application Data

(63) Continuation of application No. 29/984,714, filed on
Jan. 15, 2025, and a continuation of application No.
29/984,127, filed on Jan. 14, 2025, now Pat. No. Des.
1,092,143.

(60) Provisional application No. 63/621,554, filed on Jan.
16, 2024.

(51) Int. Cl.
| | |
|---|---|
| *A47J 43/07* | (2006.01) |
| *A47J 43/042* | (2006.01) |
| *A47J 43/046* | (2006.01) |

(52) U.S. Cl.
CPC ......... *A47J 43/0716* (2013.01); *A47J 43/042*
(2013.01); *A47J 43/046* (2013.01); *A47J*
*43/07* (2013.01)

(58) Field of Classification Search
CPC ........ A47J 43/042; A47J 43/046; A47J 43/07;
A47J 43/0716
See application file for complete search history.

(56) References Cited

U.S. PATENT DOCUMENTS

| | | | |
|---|---|---|---|
| 1,007,227 A | 10/1911 | Mitchell et al. | |
| 1,007,947 A | 11/1911 | Hansen | |
| 1,007,948 A | 11/1911 | Haskins | |
| 1,014,178 A | 1/1912 | Roberts | |
| 1,028,618 A | 6/1912 | Smith | |
| 2,284,155 A * | 5/1942 | Landgraf | A47J 43/046 |
| | | | 366/205 |
| 2,800,310 A * | 7/1957 | Snyder | A47J 43/046 |
| | | | 366/205 |
| 6,513,966 B1 | 2/2003 | Gort-Barten | |
| 6,540,394 B2 | 4/2003 | Juriga | |
| 6,554,466 B1 | 4/2003 | Ming | |
| 6,595,113 B1 | 7/2003 | Chang | |
| 6,629,492 B1 | 10/2003 | Li | |
| 6,632,013 B2 | 10/2003 | Wulf | |
| 6,637,681 B1 | 10/2003 | Planca | |
| 6,793,167 B2 | 9/2004 | Karkos, Jr. et al. | |
| 6,910,800 B2 | 6/2005 | Wu | |

(Continued)

*Primary Examiner* — Jared O Brown
*Assistant Examiner* — Matthew Stephens
(74) *Attorney, Agent, or Firm* — Patent Negotiator,
PLLC; Sarita L. Pickett

(57) ABSTRACT

The present invention relates generally to kitchen appliances. Particularly, the present invention relates to portable kitchen appliances for blending food items at power levels comparable to AC appliances. The present invention includes a cooling system for the portable blender to prevent overheating. The blender system also includes a jar and base which are stackable within one another so that the system has a first configuration for use, and a second configuration for storage.

19 Claims, 28 Drawing Sheets

(56) References Cited

U.S. PATENT DOCUMENTS

| | | | |
|---|---|---|---|
| 7,018,091 B2 | 3/2006 | Arroubi | |
| D543,072 S | 5/2007 | Ting | |
| 7,314,307 B2 | 1/2008 | Cai | |
| 7,318,666 B1 | 1/2008 | Kuan-Chih | |
| 7,422,362 B2 | 9/2008 | Sands | |
| 8,226,021 B2 | 7/2012 | Wilson | |
| 8,240,909 B2 | 8/2012 | Athey | |
| 8,282,268 B2 | 10/2012 | Karkos | |
| 8,360,480 B2 | 1/2013 | Athey | |
| 8,376,253 B2 | 2/2013 | Oblak | |
| 8,403,555 B2 | 3/2013 | Wu | |
| 8,403,556 B2 | 3/2013 | Wu | |
| 8,480,292 B2 | 7/2013 | Dushine et al. | |
| 8,485,715 B1 | 7/2013 | Bohannon, Jr. | |
| 8,529,118 B2 | 9/2013 | Davis | |
| 8,550,388 B2 | 10/2013 | Donaldson | |
| 8,621,990 B2 | 1/2014 | Fang | |
| 8,702,300 B2 | 4/2014 | Audette | |
| 8,801,266 B2 | 8/2014 | Kozlowski | |
| 8,814,072 B2 | 8/2014 | Gushwa | |
| 9,039,274 B1 * | 5/2015 | Corda | A47J 43/046 |
| | | | 366/199 |
| D759,424 S | 6/2016 | Ou | |
| 9,370,280 B2 | 6/2016 | Conti | |
| 9,603,488 B2 | 3/2017 | Upston | |
| D782,865 S | 4/2017 | Bazzicalupo | |
| D784,071 S | 4/2017 | Davies | |
| 9,687,111 B1 | 6/2017 | Trojan | |
| D794,385 S | 8/2017 | Lee | |
| D798,109 S | 9/2017 | Ulanski | |
| D801,109 S | 10/2017 | Lee | |
| 9,775,467 B2 | 10/2017 | Saphire | |
| 9,872,588 B2 | 1/2018 | Gushwa | |
| 9,883,772 B2 | 2/2018 | Conard | |
| 9,924,837 B1 | 3/2018 | Trojan | |
| D815,887 S | 4/2018 | Huang | |
| D820,033 S | 6/2018 | Zhang | |
| D830,124 S | 10/2018 | Krivos | |
| D838,539 S | 1/2019 | Shin | |
| D839,670 S | 2/2019 | Youngmann | |
| D842,566 S | 3/2019 | Gee | |
| D845,696 S | 4/2019 | Ou | |
| D863,870 S | 10/2019 | Powell | |
| D873,601 S | 1/2020 | Sirju | |
| D874,868 S | 2/2020 | Trakelis | |
| 10,617,260 B2 | 4/2020 | Sapire | |
| 10,687,669 B2 | 6/2020 | Kolar | |
| 10,702,837 B1 | 7/2020 | Pamplin | |
| D896,566 S | 9/2020 | Wang | |
| 10,792,630 B1 | 10/2020 | Pamplin | |
| D904,822 S | 12/2020 | Koszylko | |
| D905,496 S | 12/2020 | Pamplin | |
| 10,893,775 B2 | 1/2021 | Sapire | |
| D911,107 S | 2/2021 | Pamplin | |
| 10,946,353 B2 | 3/2021 | Bertsch | |
| D919,368 S | 5/2021 | Bannister | |
| D923,405 S | 6/2021 | Kettavong | |
| D924,007 S | 7/2021 | Bannister | |
| D925,270 S | 7/2021 | Bannister | |
| D925,284 S | 7/2021 | Bannister | |
| D927,256 S | 8/2021 | Bannister | |
| D927,923 S | 8/2021 | Berg | |
| D931,039 S | 9/2021 | Pamplin | |
| D938,229 S | 12/2021 | Kettavong | |
| 11,213,171 B2 | 1/2022 | Faulkner-Edwards | |
| 11,229,891 B2 | 1/2022 | Pamplin | |
| D942,621 S | 2/2022 | Cheng | |
| 11,234,560 B2 | 2/2022 | Liu et al. | |
| 11,253,106 B2 | 2/2022 | Kolar | |
| D944,590 S | 3/2022 | Berg | |
| 11,272,812 B2 | 3/2022 | Bangser | |
| D948,940 S | 4/2022 | Pamplin | |
| 11,297,980 B2 | 4/2022 | Kolar | |
| 11,304,565 B2 | 4/2022 | Bannister | |
| D951,007 S | 5/2022 | Yang | |
| D953,103 S | 5/2022 | Pamplin | |
| D953,795 S | 6/2022 | Stevenson | |
| D960,644 S | 8/2022 | Berg | |
| D974,841 S | 1/2023 | Pamplin | |
| D981,179 S | 3/2023 | Pamplin | |
| 11,659,958 B1 | 5/2023 | Pamplin | |
| 11,690,482 B1 | 7/2023 | Pamplin | |
| 11,759,056 B2 | 9/2023 | Bannister | |
| 11,877,700 B2 | 1/2024 | Moon | |
| 11,963,637 B2 | 4/2024 | Staun | |
| D1,052,406 S | 11/2024 | VanFleet | |
| 12,171,366 B1 | 12/2024 | Thai | |
| 2002/0176320 A1 | 11/2002 | Wulf | |
| 2004/0032791 A1 * | 2/2004 | Gauss | A47J 43/1006 |
| | | | 366/205 |
| 2005/0068846 A1 | 3/2005 | Davis | |
| 2008/0212403 A1 * | 9/2008 | Garman | A47J 43/0727 |
| | | | 366/205 |
| 2012/0206995 A1 | 8/2012 | Wu | |
| 2012/0275852 A1 | 11/2012 | Athey | |
| 2012/0294109 A1 | 11/2012 | Boozer | |
| 2013/0028044 A1 | 1/2013 | Karkos | |
| 2013/0043337 A1 | 2/2013 | Rukavina | |
| 2013/0319034 A1 | 12/2013 | Kounvalong | |
| 2013/0344204 A1 | 12/2013 | Goodson | |
| 2014/0212566 A1 | 7/2014 | Herbert | |
| 2015/0069157 A1 | 3/2015 | Wulf | |
| 2019/0056315 A1 | 2/2019 | Kinrot | |
| 2020/0205165 A1 | 6/2020 | Huang et al. | |
| 2020/0345181 A1 * | 11/2020 | Potaki | A47J 43/0722 |
| | | | 366/205 |
| 2022/0107691 A1 * | 4/2022 | Pamplin | A47J 43/0716 |
| | | | 366/205 |
| 2022/0183506 A1 | 6/2022 | Pamplin | |
| 2022/0225839 A1 * | 7/2022 | Kim | A47J 43/0722 |
| | | | 366/205 |
| 2022/0285984 A1 | 9/2022 | Pamplin | |
| 2022/0322881 A1 | 10/2022 | Pamplin | |
| 2023/0218115 A1 | 7/2023 | Pamplin | |
| 2023/0225563 A1 | 7/2023 | Heo | |
| 2023/0276993 A1 | 9/2023 | Aditjandra | |
| 2023/0276995 A1 | 9/2023 | Lyell | |
| 2023/0284827 A1 | 9/2023 | Beckmann | |
| 2023/0292952 A1 | 9/2023 | Lin | |
| 2023/0320532 A1 | 10/2023 | Kim | |
| 2023/0363588 A1 | 11/2023 | Wang | |

* cited by examiner

FIG. 17B
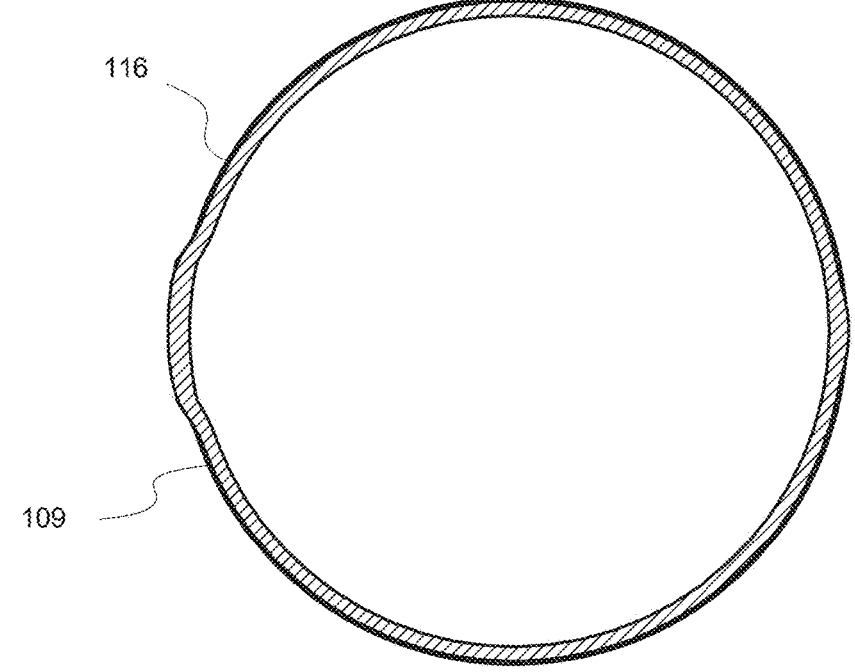
FIG. 17C
FIG. 17D

PORTABLE BLENDER SYSTEM

BACKGROUND OF THE INVENTION

1. Field of the Invention

The present invention relates generally to kitchen appliances. Particularly, the present invention relates to kitchen appliances for blending food items.

2. Description of the Prior Art

U.S. Pat. No. 11,357,359 (2022, Mizrahi) discloses a "portable blender includes a handle having at least one first attachment structure, an activation button, and a power activation member positioned for mechanical engagement with the activation button and a power switch."

U.S. Pat. No. 7,422,362 (2008, Sands) discloses "a portable blender system and method involving a mixing base that is capable of agitating the contents of a container."

SUMMARY OF THE INVENTION

Failure of the Prior Art

While there are many blenders, food processors, and stirrers available, the only blender systems that function the way the All Terrain Blender (ATB)™ portable blender functions are full size, AC plug-in powered blenders. Battery powered blenders that are currently on the market have very little power and are incapable of handling the needs of the market. The closest devices to the present invention are everyday 120 vAC blenders but these devices lack the enhanced functionality, portability, and flexibility of the cordless, full powered blender system of the present invention.

As described above, the prior art has failed to meet the needs of the public as it fails to provide a fully portable blender that provides the full functionality of an AC powered blender. The above-described parts of the prior art have not proven fully satisfactory because they simply are either not powerful enough to be adequate to meet the present needs, or they are not fully portable.

Objectives

It is an object of the present invention to provide a powerful, portable blender system. It is another object of the present invention to provide a kitchen food processor which provides full power while being capable of being arranged in a compact alternative configuration. It is a further object of the present invention to provide a portable blender system which provides speeds and powers equal to blenders powered by AC systems. It is yet another object of the invention to provide a portable blender system which provides an alternative power supply. It is a further object of the present invention to provide a portable blender system which provides the convenience of being able to be used in any location without regard to the availability of AC power.

BRIEF DESCRIPTION OF THE INVENTION

The present invention achieves these and other objectives by providing a portable blender system having a: full sized, fully self-contained, battery powered blender that is more powerful than the average home corded blender. The lithium-ion battery pack of the present system can blend over 200 servings of 6 oz frozen drinks on a single charge. If the battery is depleted, the present invention can be powered by its' recharging cord. Alternatively, a replacement battery pack can be purchased.

The solid-state motor control has automatic jam detection and auto reverses to clear jams. The speed control is infinitely variable from 1000 to 17,000 rpm. the present invention has an oscillating forward/reverse pulse as well as forward-only pulse control.

The jar has a full two-and-a-half-quart capacity. The motor and battery base are so compact they can be stored inside of the interior portion of the jar. The jar is made of a crystal clear, shatter resistant, dishwasher safe, BPA-free plastic. One such plastic is a copolymer made from three monomers: dimethyl terephthalate (DMT), cyclohexanedimethanol (CHDM), and 2,2,4,4-tetramethyl-1,3-cyclobutanediol (CBDO). One example of this type of copolymer is Tritan Renew TX1001-25™, offered by the Eastman Chemical Company. However any copolymer with similar qualities would be acceptable: toughness, hydrolytic stability, and heat and chemical resistance. A copolyester capable of being molded into various applications without incorporating high levels of residual stress. Combined with outstanding chemical resistance and hydrolytic stability, these features give molded products enhanced durability in the dishwasher environment, which can expose products to high heat, humidity and aggressive cleaning detergents. This copolymer must be capable of being used in repeated use food contact articles under United States Food and Drug Administration (FDA) regulations and certified to NSF/ANSI Standard 51 for Food Equipment Materials. A suitable copolymer may be certified by International Sustainability & Carbon Certification (ISCC), a global, independent agency for tracking sustainable content in a variety of industries. A suitable copolymer may be produced with ISCC certified circular content by mass balance allocation. A suitable copolymer may enable a brand to reduce consumption of fossil feedstock-based plastics, achieve sustainability targets without compromise, and be a fast mover in a growing market for sustainable consumer products. A suitable copolymer may be made with 50 percent recycled content that has earned International Sustainability & Carbon Certification (ISCC) using mass balance allocation. A suitable copolymer may be made using molecular recycling technology, which breaks down hard-to-recycle plastics into molecular building blocks to create new polymers.

The purpose of the present invention is to blend and or pulverize edible foods and beverages. The present invention is intended for blending and pureeing food and beverage as desired by the user. The present invention is a high powered, large capacity cordless kitchen blender intended to be used anywhere 110 vAC power is not available. Because the base can be stored inside of the jar, the present invention is far more compact than a corded kitchen blender and is perfect for any living space that is storage space constrained. Not having to be plugged in, the present invention is far more convenient than a corded blender.

The automatic jam detection and auto reverse functionality cures the problem caused when very hard material becomes jammed in the blender blades, as the auto reverse function clears the jam. The forward/reverse pulse function serves to more efficiently incorporate tough-to-blend foods into the mixture.

The infinitely variable speed control allows the operator to find exactly the right speed for the density and fluidity of the product being blended.

The controls may consist of a 1) power on/off button, 2) start/stop button, 3) infinitely variable speed control wheel, 4) forward pulse button, 5) oscillating forward/reverse pulse button, and 6) a five-level battery charge/fuel gauge that lights every time the blender is powered on.

The present invention was developed to fulfill the long-standing need of outdoor cooks, bartenders, and entertainers to be able to blend beverages and food stuffs in places where there is no 110 v AC power source conveniently available. This includes picnickers, campers, tailgate partiers, back yard barbecuers, people traveling in RVs, boaters, river runners, and back country ATV'ers. The invention's compact and cordless design makes it the ideal blender for anyone living in a space constrained home such as small apartments, living on a boat or in a mobile home. It is also designed for cooks that want the portability and convenience of a cordless appliance.

This invention improves upon the prior art because, to date, all battery powered blenders are, at most, two cup blenders that are only powerful enough to stir liquid drinks like protein powder in water and have a very limited battery capacity. The present invention has orders of magnitude greater power and battery capacity.

A major problem of the prior art that has previously prevented enabling this capacity, is that for the previously existing cordless blenders the problems are no power, very small battery packs, and one pint jar capacity. These devices are in no way functionally equivalent to a kitchen blender and are more comparable to a device intended for stirring non-viscous liquids.

Of the existing corded blenders, their use is restricted to places where 110 v AC power is readily accessible. These devices are bulky, heavy, and hard to store. Some devices (Vitamix™, etc.) are so large and heavy that the blender inevitably takes up valuable counter space when not in use.

This invention solves this problem associated with the prior art because the present invention is much more powerful than existing cordless blenders and the jar is a full size 2.5 qt jar, not a 1 pint jar. The present invention is smaller in a packing configuration than a common home 110 v blender. For storage, the present invention packs into its own jar, taking up half as much shelf space as conventional devices, and as a cordless device, is much more convenient to use anywhere the user wants to go.

With the anti-jam auto reversing technology and auto reversing pulse function of the present invention, the present invention is far more efficient at breaking down solid ingredients without jamming. Effective auto reversing is made possible in the present invention by incorporating both a brushless direct current motor (BDCM) and solid-state controller. These were not previously capable of being incorporated in blenders due to the frequent over-heating and subsequent significant damage to internal components which resulted. The present invention solved these problems by incorporating a cooling system (among other features) as described in further detail below.

By solving the problems of the prior art, the present invention is able to provide a compact powerful blending system as lithium-ion batteries supply 18 v DC electricity to a powerful BLDC motor that is coupled to chopping, blending, grinding blades in the jar. Choice between chopping, blending, and grinding is controlled by an infinitely variable speed control wheel and bi-directional pulse functions.

Further objectives of the present invention include providing a portable blender system for dicing, blending, and pulverizing food and liquid. The portable blender system may have a jar with an interior portion, a first opening, and a second opening. A lid capable of releasable engagement with the first opening of the jar. A base capable of interlocking engagement with the second opening of the jar. The portable blender system has a first working configuration and a second storage configuration. The base is capable of being completely enclosed within the interior portion of the jar when the portable blender system is in the second storage configuration.

The portable blender system has a first working configuration with a first volume, and a second storage configuration with a second volume, and a ratio of size of the first volume to the second volume is at least 1.2 to 1. A ratio of the size of the first volume to the second volume for some embodiments is at least 1.6 to 1. A ratio of the size of the first volume to the second volume for some embodiments is at least 1.8 to 1.

The portable blender system has a battery pack with batteries connected in series so the battery pack is capable of holding 8000 mAh with a maximum discharge of 64 A at 18.5 v DC for a power of 1184 W with a maximum blade speed of 18000 RPM.

The portable blender system has a modified 18.5 v, 2,400 W, brushless direct current motor having a nominal voltage of at least 22 v and which is capable of at least 18,000 rpm.

The portable blender system has jar with a hollow body with a first portion has a circular profile, a second portion has a profile with at least six sides, and a third portion has a circular profile.

In some embodiments, the portable blender system has a jar with a hollow body with a first portion that has a circular profile, a second portion has an octadecagon profile, and a third portion has a circular profile.

The portable blender system may have a lid for the jar. The lid may have a first sealing ring and a second sealing ring extending radially from a vertical wall of the lid. The first sealing ring may have a first perforation, and the second sealing ring may have a second perforation. The first sealing ring may be radially disparate from the second sealing ring such that the first sealing ring perforation and the second sealing ring perforation are staggered vertically disparate from one another.

The portable blender system may have a cooling system having an intake vent, an air duct extending through the base, and an exhaust vent.

The portable blender system may have a printed circuit board for controlling the portable blender system, a cooling system capable of providing an air ventilation stream through an air duct adjacent the printed circuit board.

The portable blender system may have a battery pack, having a first battery adjacent a second battery, for powering the portable blender system; and a cooling system capable of providing an air ventilation stream through an air passage extending between the first battery and the second battery.

The portable blender system may have a cooling system having an intake louver, an exhaust louver, an air duct extending through the base between the intake louver and the exhaust louver, and an air dam separating an intake plenum adjacent the intake louver from an exhaust plenum adjacent the exhaust louver.

The portable blender system may have a cooling system with an intake louver, an exhaust louver, an air duct extending through a first portion and a second portion of the base between the intake louver and the exhaust louver, a first ring extending around a perimeter of the first portion, a second ring extending around an inner perimeter of the second portion, wherein the first ring and the second ring abut against one another and prevent air flow from the second portion to the first portion.

A further objective of the present invention is to provide a portable blender system for dicing, blending, and pulverizing food and liquid. The portable blender system having a jar assembly with a jar body having an interior portion, a first opening, and a second opening; a base assembly supporting the jar assembly; a joining assembly which reversibly secures the base assembly and jar assembly in a first configuration of the portable blender system; a blade assembly which reversibly and matingly engages the interior portion of the jar assembly, the blade assembly capable of dicing, blending, and pulverizing the food and liquid within the jar body when the portable blender system is in the first configuration; and a power assembly for powering the portable blender system.

The portable blender system may have a second storage configuration in which the base assembly is completely enclosed within the interior portion of the jar body; wherein the first configuration has a first volume, and the second configuration has a second volume, and a ratio of size of the first volume to the second volume is at least 1.2 to 1.

The portable blender system of claim 14 may have a second storage configuration in which the base assembly is completely enclosed within the interior portion of the jar body; wherein the first configuration has a first volume, and the second configuration has a second volume, and a ratio of size of the first volume to the second volume is at least 1.6 to 1.

The portable blender system may have a second storage configuration in which the base assembly, the blade assembly, and the power assembly are completely enclosed within the interior portion of the jar body.

The present invention also provides a portable blender system for dicing, blending, and pulverizing food and liquid, the portable blender system having a jar assembly; a base assembly supporting the jar assembly in a first configuration of the portable blender system; a joining assembly which reversibly secures the base assembly and jar assembly in the first configuration of the portable blender system; a blade assembly which reversibly and matingly engages the interior portion of the jar assembly, the blade assembly capable of dicing, blending, and pulverizing the food and liquid within the jar body when the portable blender system is in the first configuration; a motor assembly within the base assembly for rotating blades of the blade assembly; a printed circuit board for providing instructions to the motor assembly; a power assembly for powering the motor assembly; and a cooling system for cooling each of the motor assembly, the printed circuit board, and the power assembly.

The portable blender system may have a second storage configuration in which the base assembly is completely contained by the jar assembly; wherein the first configuration has a first volume, and the second configuration has a second volume, and a ratio of size of the first volume to the second volume is at least 1.4 to 1.

BRIEF DESCRIPTION OF THE DRAWINGS

FIG. 17B is a cross-sectional slice of the jar shown in FIG. 17A.

FIG. 17C is a cross-sectional slice of the jar shown in FIG. 17A.

FIG. 17D is a cross-sectional slice of the jar shown in FIG. 17A.

DETAILED DESCRIPTION OF THE INVENTION

Figure 1:
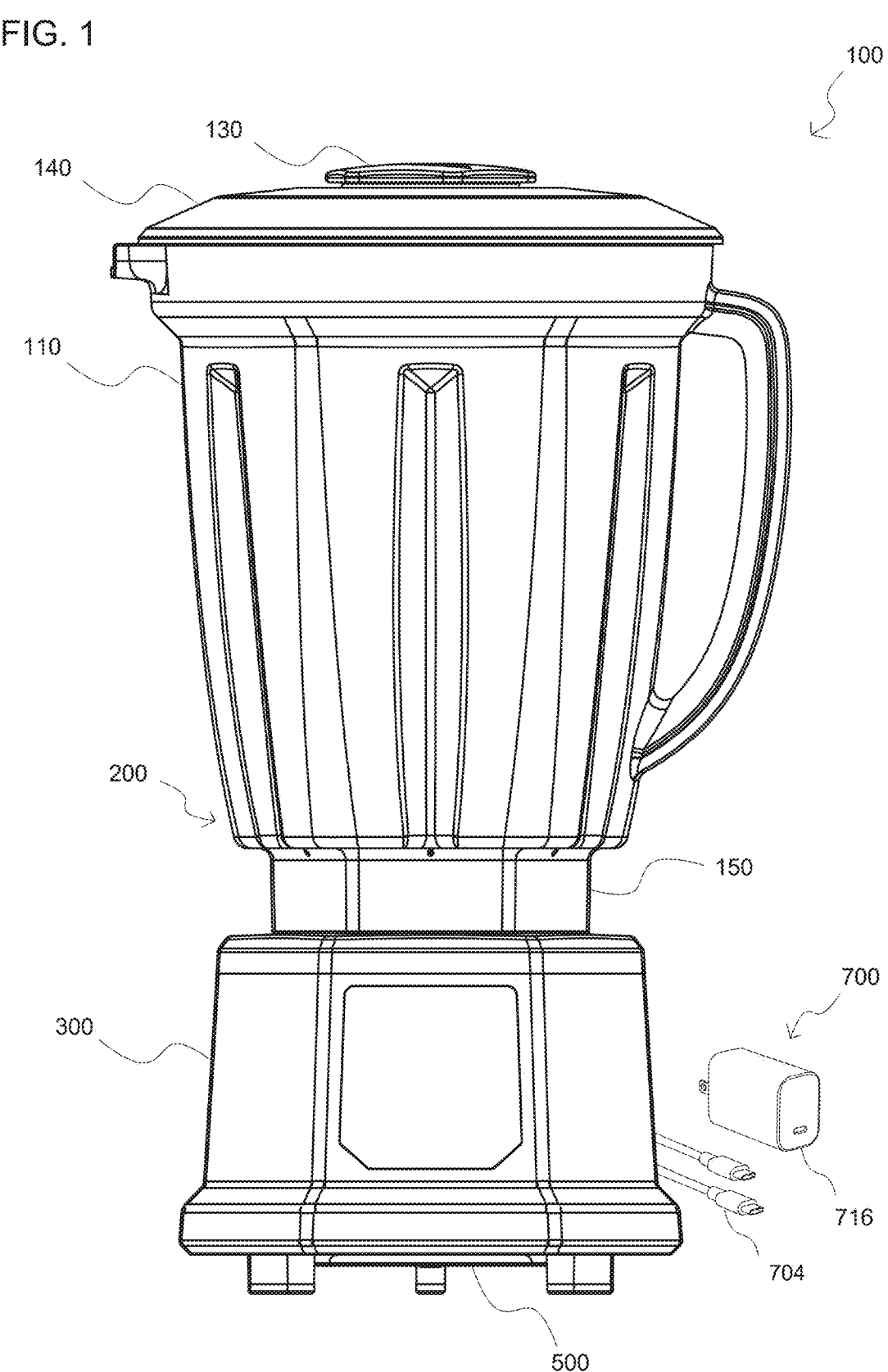
FIG. 1 is a front view of one embodiment of the portable blender system of the present invention in a first configuration, (with jar rotated to right).
Figure 2:
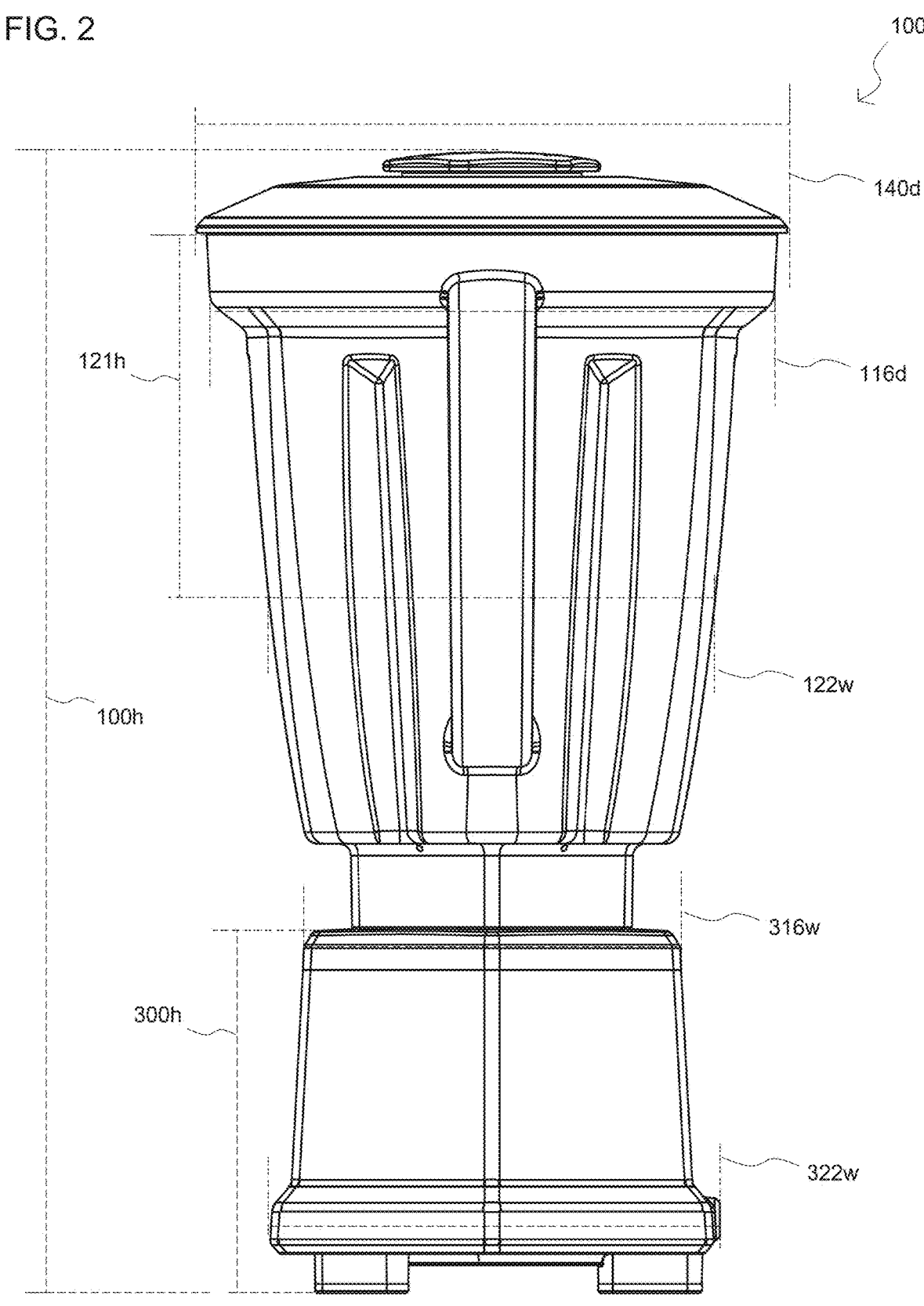
FIG. 2 is a rear planar view of the embodiment shown in FIG. 1.
Figure 3:
FIG. 3 is a front view of one embodiment of the portable blender system of the present invention in a first configuration, (with jar rotated to right).

FIGS. 1-3: Portable Blender System 100

The overall system of the present invention is illustrated in FIGS. 1-3 in the operating configuration. FIG. 1 shows a front view of a portable blender system 100 of the present invention in a first operating configuration. FIG. 2 is a rear planar view of the embodiment shown in FIG. 1, with annotations to facilitate measurement discussions. FIG. 3 is a front view of another embodiment of the portable blender system of the present invention, also in the first operating configuration.

Each embodiment of the portable blender system 100 has a jar assembly 110, a blade assembly 200 which reversibly and matingly engages an interior portion 120 of the jar assembly 110 for dicing, blending, and/or pulverizing the food/liquid components within the jar body 111, a base assembly 300 for supporting the jar assembly 110, a joining assembly 150 which reversibly secures the base assembly and jar assembly, and a power assembly 700 for connection to, powering, and recharging of the system 1.

FIG. 1 is more specifically, a front view of one embodiment of the portable blender system 100 of the present invention in a first configuration, (with jar in a rotated configuration). Note that while both the joining assembly 150 and blade assembly 200 are present, neither of these assemblies are fully visible from the exterior of blender system 100 in this first operating configuration shown in FIG. 1.

In this configuration, a portion of the measuring cup 130 is visible extending upward out of the jar lid 130. The exterior portion of the jar lid 140 is likewise visible extending outward of the jar body 111. The spout 110 is visible opposite the jar handle 117 of the jar body 111 that is sometimes tapered. A first set of jar ribs 114 are visible on the exterior portion of the jar body 111. The jar body 111 is securely engaged with the base 300 via the joining assembly 150. The user interface control panel 350 is visible on the front of the base 300. A battery pack charger 716 is also illustrated as part of the power assembly 700, along with the USB-C power cord 704.

In this configuration, the whole portable blender system 100 generally has a height 100h between 200 to 400 mm, usually between 300 to 350 mm, and preferably 325 mm. For another embodiment in this configuration, the whole portable blender system 100 generally has a height 100h between 200 to 400 mm, usually between 300 to 350 mm, and preferably 375 mm.

The largest diameter/width of the assembly 100 corresponds to the diameter 140d of the lid 140. The lid 140 generally has a diameter 140d that may be in a range between 100-300 mm, usually between 150 to 250 mm, and preferably 191 mm.

The largest diameter of an interior working portion of the jar assembly 110 corresponds to a diameter of an upper enlarged neck portion 116 of the jar 110. The upper enlarged neck portion 116 has a diameter 116d that may be in a range between 100-300 mm, usually between 150 to 250 mm, and preferably 182 mm.

A first portion 121 of the jar 110 has a first diameter that equals the diameter 116d of the enlarged neck portion 116. The first portion 121 transitions to a generally hexagonal shape and has a second smaller width that may be in a range between 100-300 mm, usually between 120 to 170 mm, and preferably 150 mm.

An intervening portion 122 of the jar 110 has a first upper diameter that equals the second lower diameter of the first portion 121. The intervening portion 122 has a second lower diameter that may be in a range between 100-300 mm, usually between 120 to 170 mm, and preferably 130 mm.

The first portion 121 of the jar 110 has a height 121h that may be in a range between 50-200 mm, usually between 70 to 150 mm, and preferably 114 mm.

The whole main base assembly 300 has a height that is in a range between 100-200 mm, usually between 130 to 150 mm, and preferably 141 mm, while in another embodiment, the preferred height is 136 mm. However, the main base assembly 300 visible in FIG. 2 has a height 300h that is in a range between 100-200 mm, usually between 115 to 125 mm, and preferably only 121 mm.

Having a generally hexagonal prismatic shape, the width of the base 300 varies based on the height 300h at which it is measured, and also on whether it is being measured along the long diagonal (between opposing vertices) or the short diagonal (between opposing parallel sides). The base 300 has its smallest width (short diagonal) along an uppermost portion 316 that has a width 316w that is in a range between 90-150 mm, usually between 100 to 120 mm, and preferably 118 mm along the long diagonal, while the short diagonal is 104 mm. The base 300 has its largest width (long diagonal) along a curb 332 that has a width 322w that is in a range between 110-200 mm, usually between 130 to 170 mm, and preferably 160 mm along the long diagonal, while the short diagonal is 139 mm.

FIGS. 4-9: Storage Configurations

One of the difficulties facing travelers with a blender is that storage is at a premium during traveling. The present invention addresses this problem by providing a storage configuration which halves the overall storage space square footage required for traveling when compared to prior art models.

Figure 4:
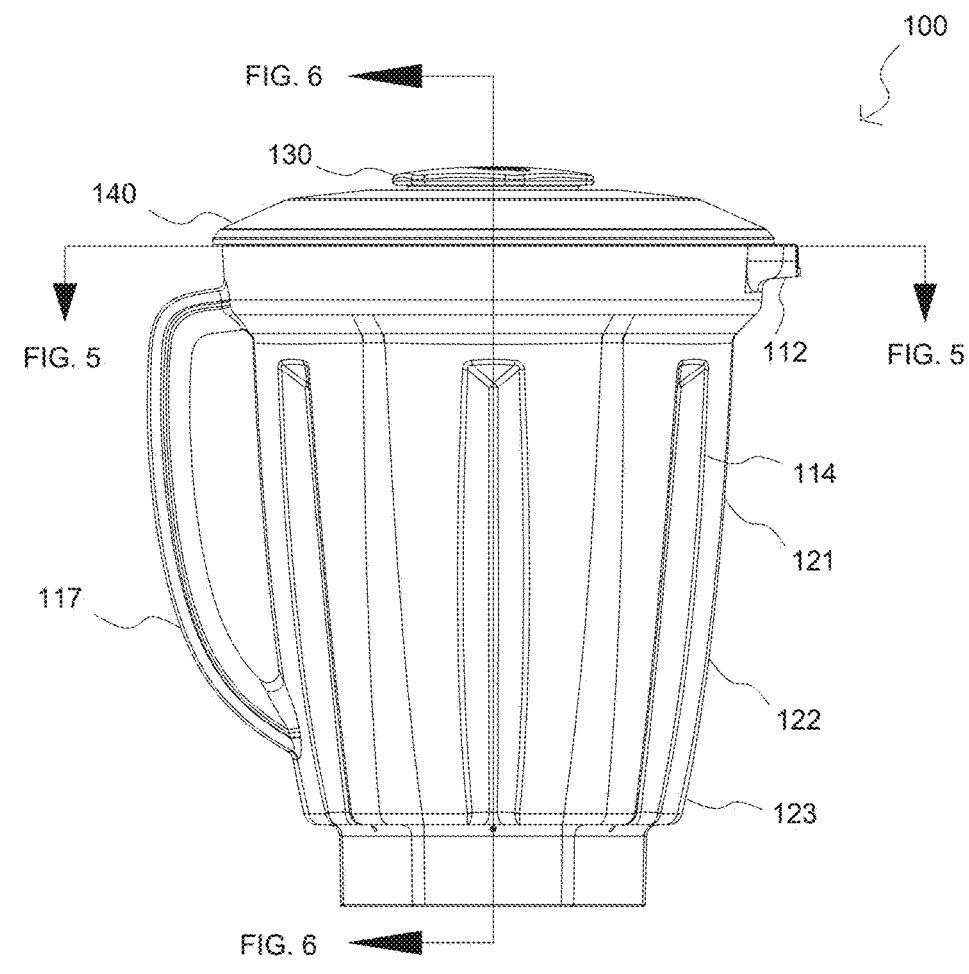
FIG. 4 is a side planar view of the embodiment shown in FIG. 1 in a second configuration.
Figure 5:
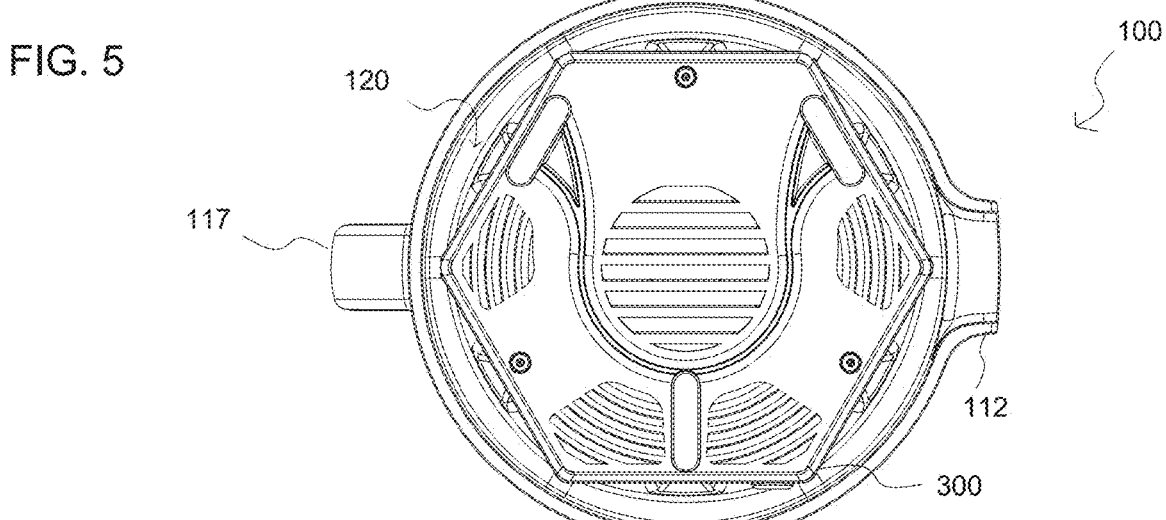
FIG. 5 is a first cross-sectional top-facing view of the embodiment in the second configuration as shown in FIG. 4.
Figure 6:
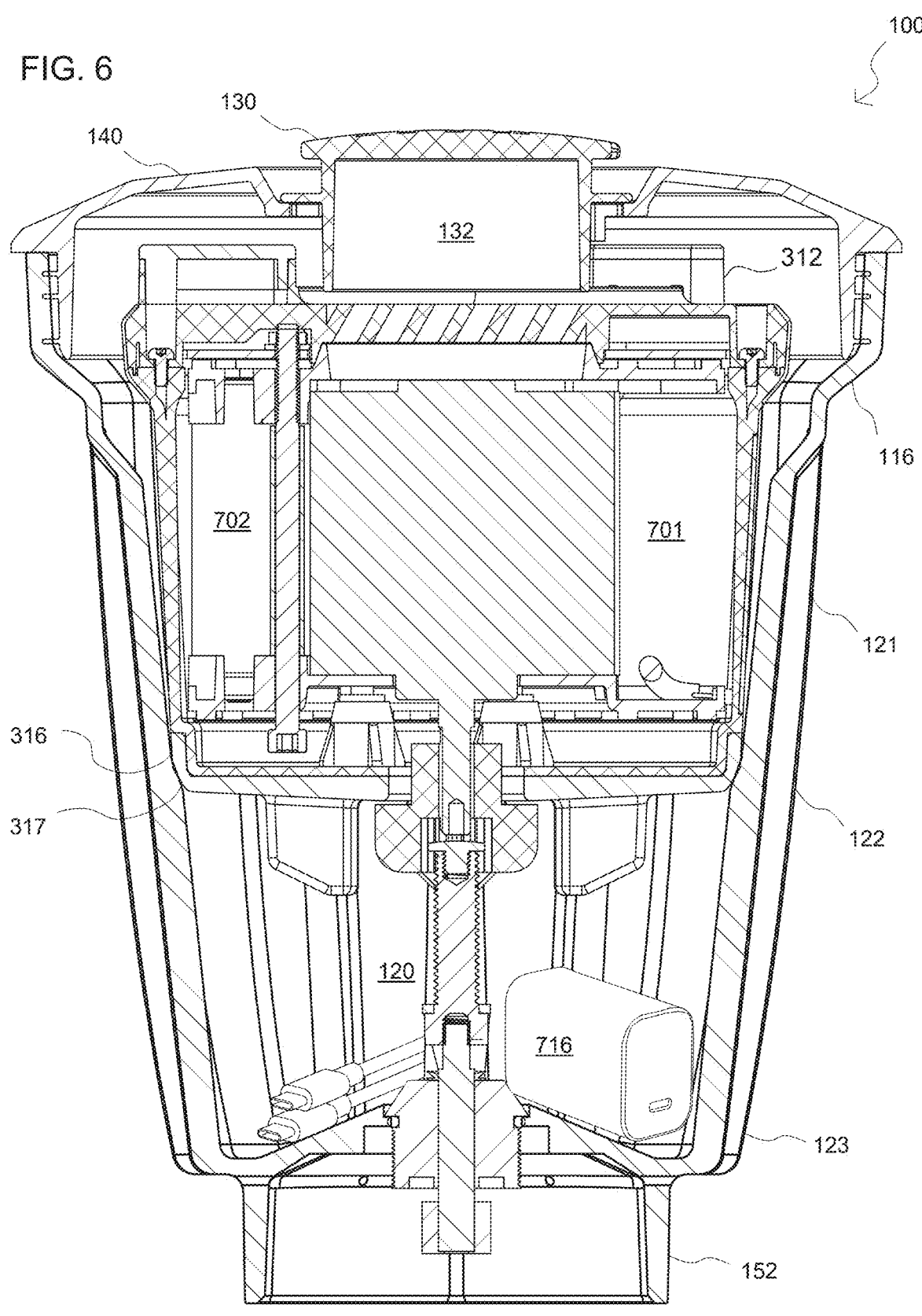
FIG. 6 is a second cross-sectional side-facing view of the embodiment in the second configuration as shown in FIG. 4.
Figure 7:
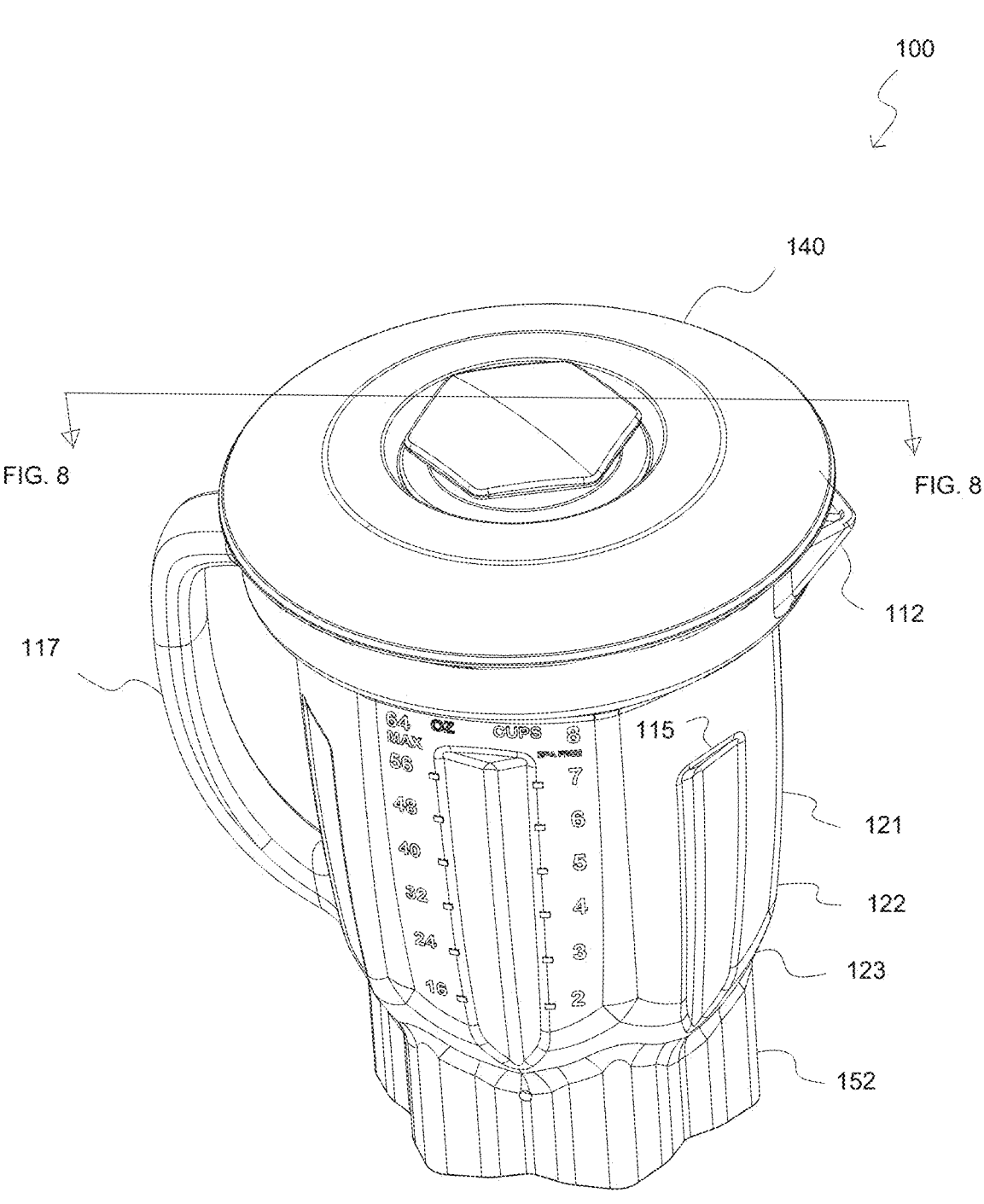
FIG. 7 is a top-left-front perspective view of the embodiment shown in FIG. 3 in a second configuration.
Figure 8:
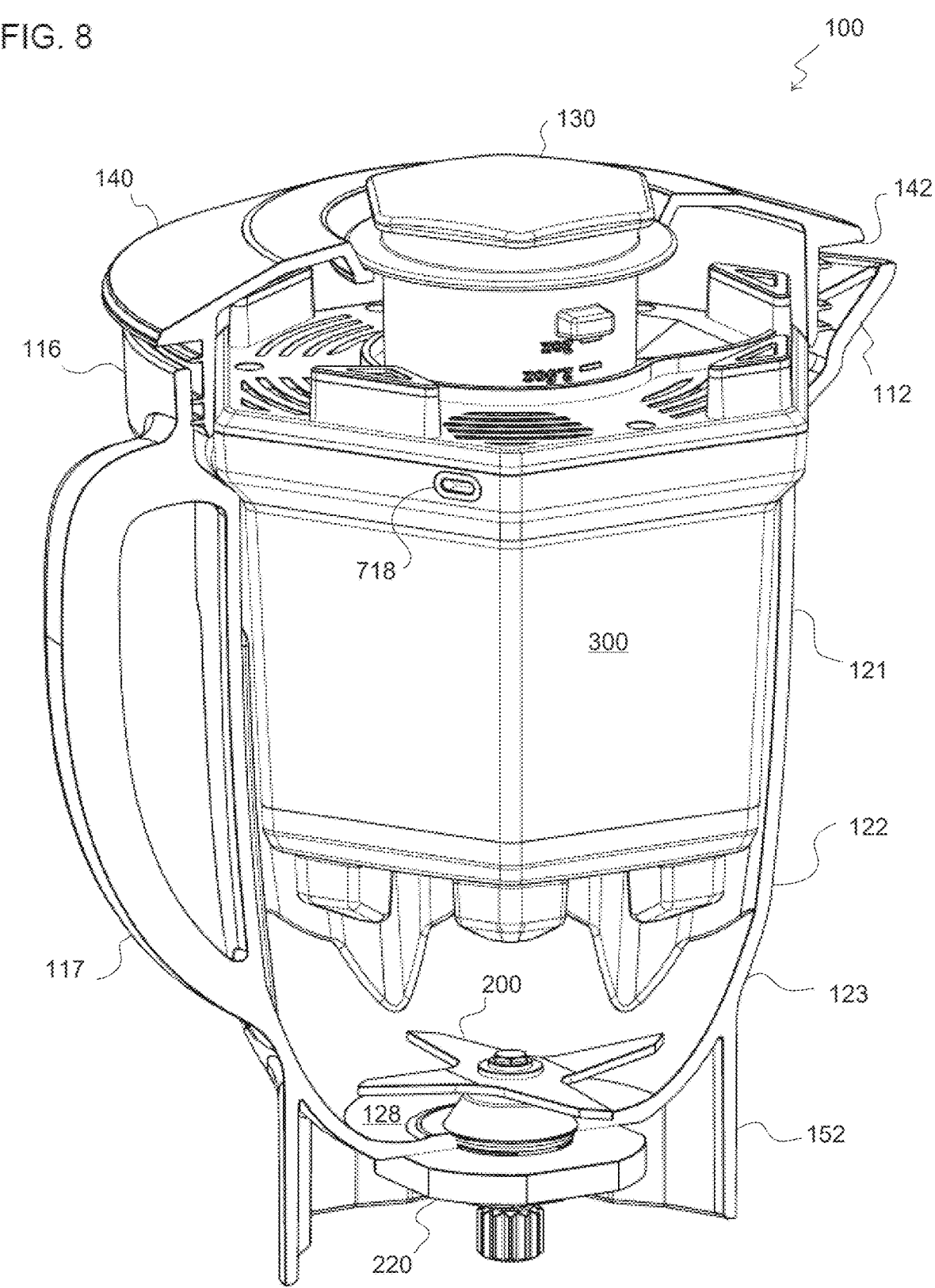
FIG. 8 is a first partial cross-sectional top-right-rear perspective view of the embodiment shown in FIG. 7.
Figure 9:
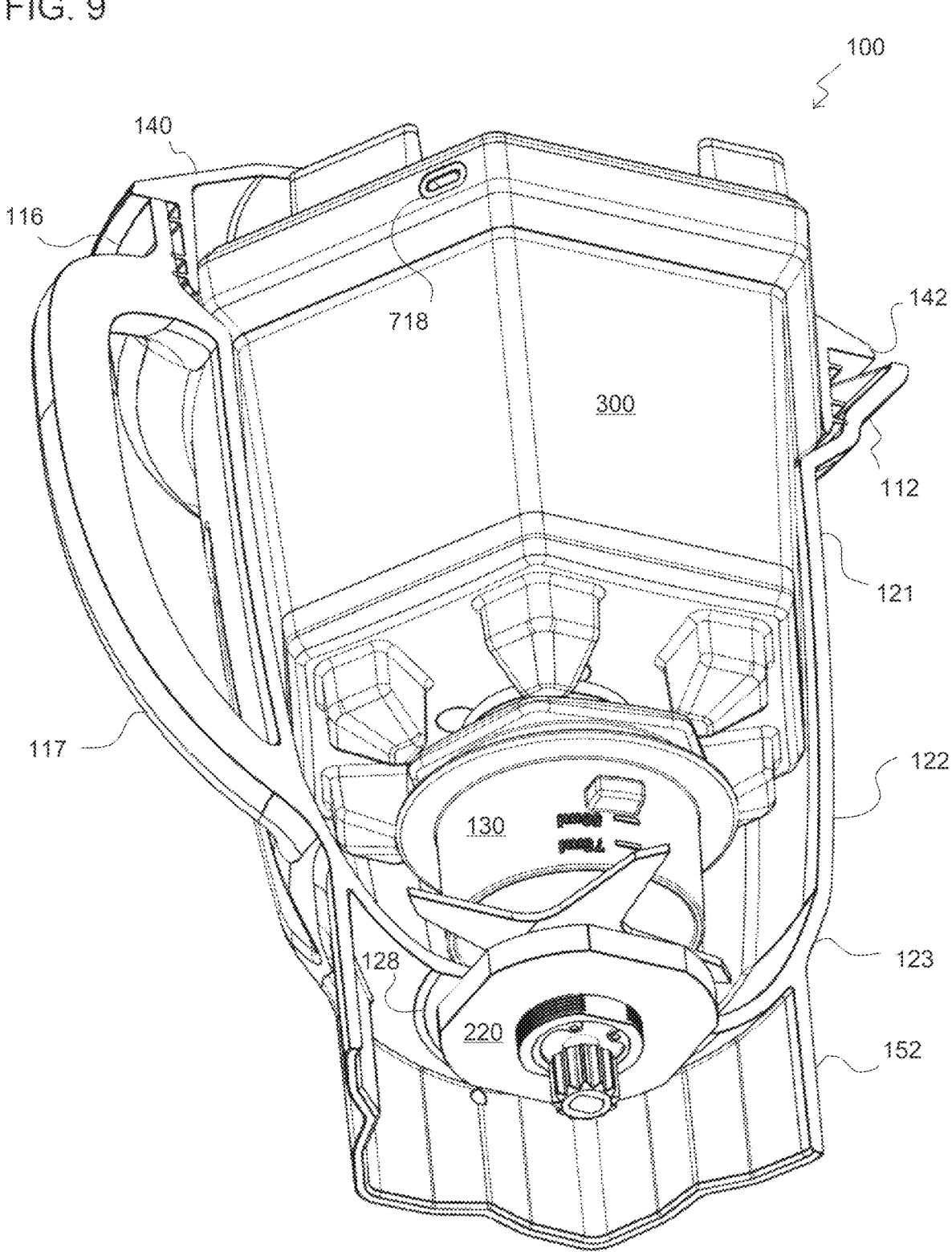
FIG. 9 is a second partial cross-sectional top-right-rear perspective view of the embodiment shown in FIG. 7 in a further storage configuration.

FIGS. 4-9 show different embodiments in various storage configurations according to the present invention. FIG. 4 is a side planar view of the embodiment shown in FIG. 1 in a second configuration for storage. FIG. 5 is a first cross-sectional top-facing view of the embodiment shown in FIG. 4—or simply the same embodiment with the lid and cap removed. FIG. 6 is a second cross-sectional view of the embodiment shown in FIG. 4, only now shown from the side. FIG. 7 is a top-left-front perspective view of the embodiment shown in FIG. 3 in a packing configuration. FIG. 8 is a first partial cross-sectional top-right-rear perspective view of the embodiment shown in FIG. 7. FIG. 9 is a second partial cross-sectional top-right-rear perspective view of the embodiment shown in FIG. 7 in a further storage configuration.

In some storage configurations, when the embodiment includes a lid 140 having perforations 143, these offset perforations 143 will prevent the lid 140 from completely waterproofing the interior portion 120 of the jar assembly 110. In other embodiments the cup abuts against the base 300, or is otherwise kept in an offset position, which would likewise keep the lid 140 from waterproofing the top sealing ring 138 entirely. This prevents moisture from being trapped during storage.

Alternatively, one storage configuration, as shown in FIG. 9, facilitates placing the measuring cup 130 in the bottom bowl portion 123 of the jar 111 during storage. In this storage configuration, ventilation is achieved through the middle aperture 149 in the lid 140. In either configuration, this prevents moisture from being trapped during storage. Preventing moisture from being trapped then prevents corrosion of any nonstainless steel metallic components during storage.

In this second storage configuration, the blender system 100 generally has a height 100$h$ between 150 to 300 mm, usually between 175 to 250 mm, and preferably 383 mm. In this configuration, another embodiment of the assembly 100 generally has a height 100$h$ between 200 to 300 mm, usually between 250 to 260 mm, and preferably 259 mm. Alternatively, with one storage configuration, as shown in FIG. 9, the blender system 100 generally has a height 100$h$ between 150 to 300 mm, usually between 175 to 250 mm, and preferably 245 mm.

The assembly 100 generally has a storage space size in this storage configuration that is smaller in a range between 0.4-0.8 times the size of the use configuration, usually at least 0.75 times the size of the use configuration, and preferably at least 0.6 times the size of the use configuration.

This results in a total storage shelf consuming volume of less than 5000 mL. As the jar assembly has a total interior volume of more than 3000 mL, this results in a shelf volume to inner volume ratio of less than 5:3. The prior art portable blenders do not have the power that the present system has. However, even then, these devices still more typically have a total storage shelf volume of more than 1000 mL, and a total interior volume of less than 500 mL resulting in a shelf volume to inner volume ratio of greater than 2:1.

In any of these storage configurations, the portable blender system 100 generally has an overall counter/storage space size that is less than half the size of currently available products that have the same speed functionality and capability which typically have a shelf volume to inner volume ratio of greater than 5:1.

Figure 10:
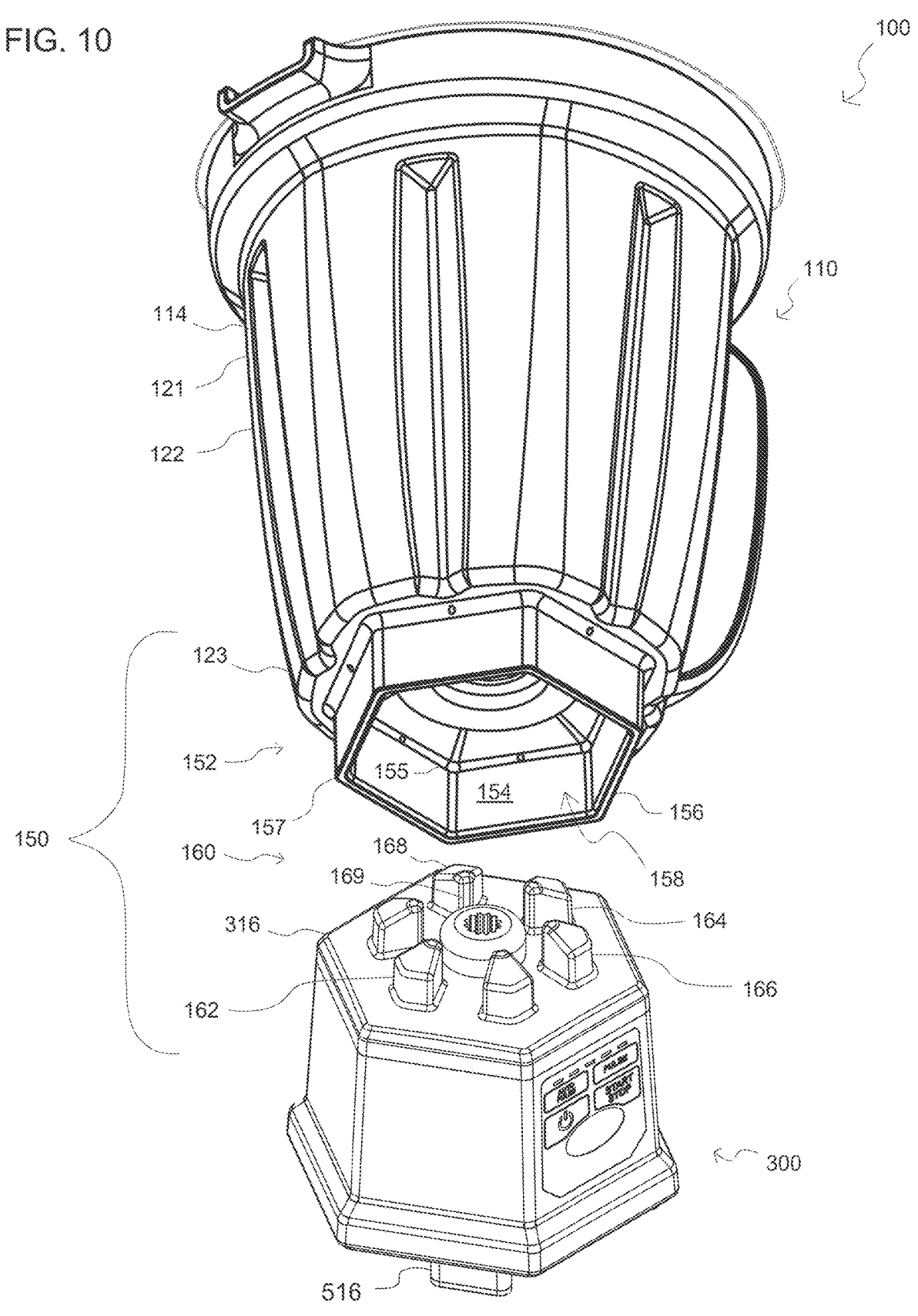
FIG. 10 is a front-left perspective view of the embodiment shown in FIG. 1 transitioning from the first configuration to a second configuration (in a third transitory configuration).

FIG. 10: Joining Assembly 150

The system 100 has a jar assembly 110 which is reversibly secured to a base assembly 300 by a joining assembly 150. As such, a first interlocking portion of the joining assembly 150 is irreversibly integrated with the jar assembly 110, and a second interlocking portion of the joining assembly 150 is irreversibly integrated with the base assembly 300. FIG. 10 illustrates these interlocking portions by slightly lifting the jar assembly 110 off of the bass assembly 300, tilting the jar assembly 110 away with respect to the viewable page, and tilting the base assembly 300 forwards with respect to the viewable page. That is, FIG. 10 is a front-left perspective view of the embodiment shown in FIG. 1 transitioning from the first configuration to a second configuration (in a third transitory configuration) which essentially places the jar assembly in a front-left-bottom perspective view and the base assembly in a front-left-top perspective view.

One portion of the joining assembly 150 that is irreversibly integrated with the jar assembly 110 is the skirt 152, located below the bowl 123 of the jar assembly 110. The skirt 152 has six walls 154 that extend downwards from a top portion 155 that is integrated with the bowl 123 of the jar assembly 110. The walls 154 extend downwards, ending in a rim 156, and each wall integrated with each adjacent wall 154 along vertices 157 and enclosing an interior portion 158.

Having a generally hollow hexagonal shape, the width of the skirt 152 actually varies based on the height 152$h$ at which it is measured, and also on whether it is being measured along the long diagonal (between opposing vertices) or the short diagonal (between opposing parallel sides). The skirt 152 has its smallest width along an upper-most portion 155 that has a width that is in a range between 100-120 mm, usually between 102 to 110 mm, and preferably 108 mm. The skirt 152 has its largest width along the rim 156 that has a width that is in a range between 100-150 mm, usually between 102 to 130 mm, and preferably 122 mm.

The interior portion 158 of the skirt 152 has its smallest width along an interior of the uppermost portion 155 that has a width that is in a range between 90-120 mm, usually between 95 to 110 mm, and preferably 101 mm. The interior portion 158 of the skirt 152 has its largest width along the interior of the rim 156 that has a width that is in a range between 100-150 mm, usually between 102 to 130 mm, and preferably 122 mm.

The vertices 157 along the interior portion 158 of the skirt 152 have an angle that is in a range between 90-185 degrees, usually between 95 to 175 degrees, and preferably 120 degrees.

The portion of the joining assembly 150 that is irreversibly integrated with the base assembly 300 are the bosses 160, which are located along an uppermost portion 316 of the base assembly 300. Each boss 160 has a generally irregular pentagonal base which creates a transition fit with the interior portion 158 of the skirt 152 along vertices 157, thereby interlocking the jar 110 and base 300.

There are generally six bosses (posts) 160 that the jar skirt 152 interfaces with. Contrary to the prior art, the inventor found that despite the ease of manufacturing that was enabled by having the bosses towards the center of the upper surface of the base 300, this caused other problems. To address these difficulties, the present invention moved the six bosses adjacent the edge of the base 300, while maintaining equidistant separation from one another, being displaced from one another.

The bosses 160 each have an irregular pentagonal prismatic shape with five walls 162, 164, 169 extending upwards from the uppermost portion 316 of the base assembly 300. The exterior facing walls 162 meet along exterior vertices 166 which have angles that complement the angle of the vertices 157 of the skirt 152. The radial walls 164 abut exterior facing walls 162 along vertices which are less than ninety degrees. The radial walls 164 extend upwards and inwards until abutting the interior facing walls 169. The radial walls 164 extend for a distance inwards, towards the shaft, for significantly less than half the smallest total base width 316*w* to ensure that a sufficient gap remains between opposing interior facing walls 169. As irregular pentagonal prismatic shapes, the five walls 162, 164, 169 are not all equilateral. However, the exterior facing walls 162 are generally complimentary to each other, and the interior radial walls 164 are also generally complimentary to each other. That is, in most embodiments, a line of symmetry exists and extends from the exterior vertex 166 to the center of the interior facing wall 169. In some embodiments the walls extend upwards perfectly straightly, in other embodiments the exterior facing walls 162 slant slightly from their abutment with the top 316 of the base 300 to the tops 168 of the bosses 160, such that the bosses are slightly wider at the bottom than at the top.

The exterior facing walls 162 have a height that is in a range between 10-100 mm, usually between 15 to 20 mm, and preferably 18 mm. The exterior facing walls 162 have a width that is in a range between 10-50 mm, usually between 20 to 30 mm, and preferably 25 mm.

The radial walls 164 have a height that is in a range between 10-30 mm, usually between 15 to 25 mm, and preferably 19 mm. The radial walls 164 have a width that is in a range between 5-30 mm, usually between 10 to 20 mm, and preferably between 14-16 mm.

The interior facing walls 169 have a height that is in a range between 10-100 mm, usually between 20 to 70 mm, and preferably 19 mm. The interior facing walls 169 have a width that is in a range between 10-100 mm, usually between 20 to 70 mm, and preferably 7 mm.

The exterior facing vertices 166 between the exterior facing walls 162 of the bosses 160 have an angle that is in a range between 90-180 degrees, usually between 95 to 170 degrees, and preferably 120 degrees.

FIGS. 11-25: Jar Assembly 110

Figure 11:
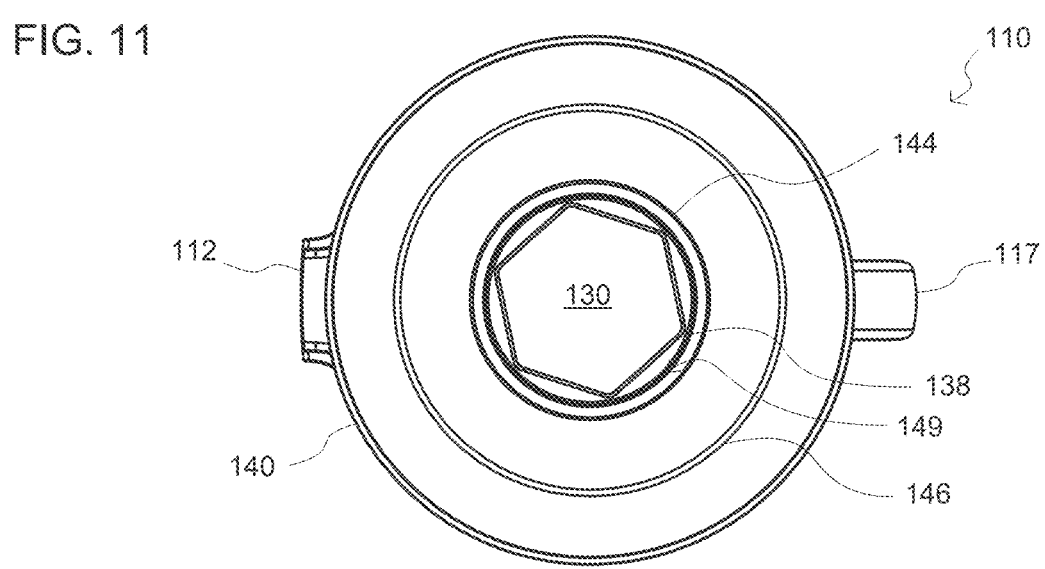
FIG. 11 is a top planar view of a jar, lid, and cup according to one embodiment of the present invention.
Figure 12:
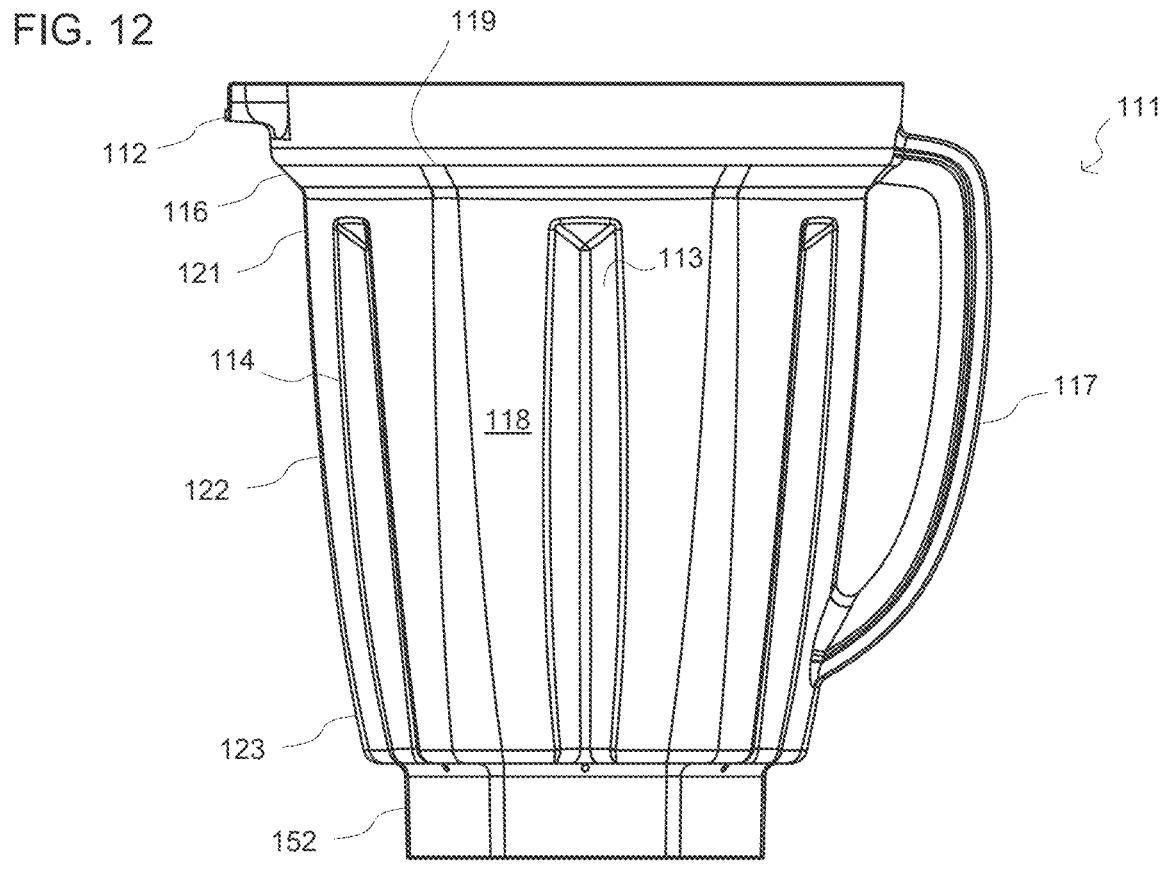
FIG. 12 is a side planar view of the jar according to one embodiment of the present invention.
Figure 13:
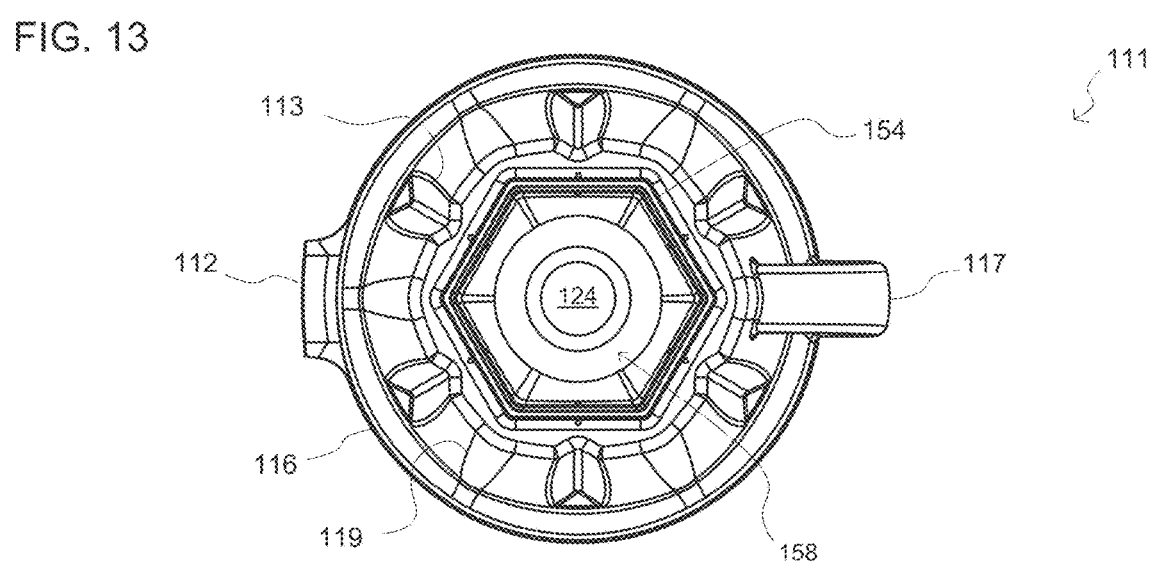
FIG. 13 is a bottom planar view of the jar according to one embodiment of the present invention.
Figure 14:
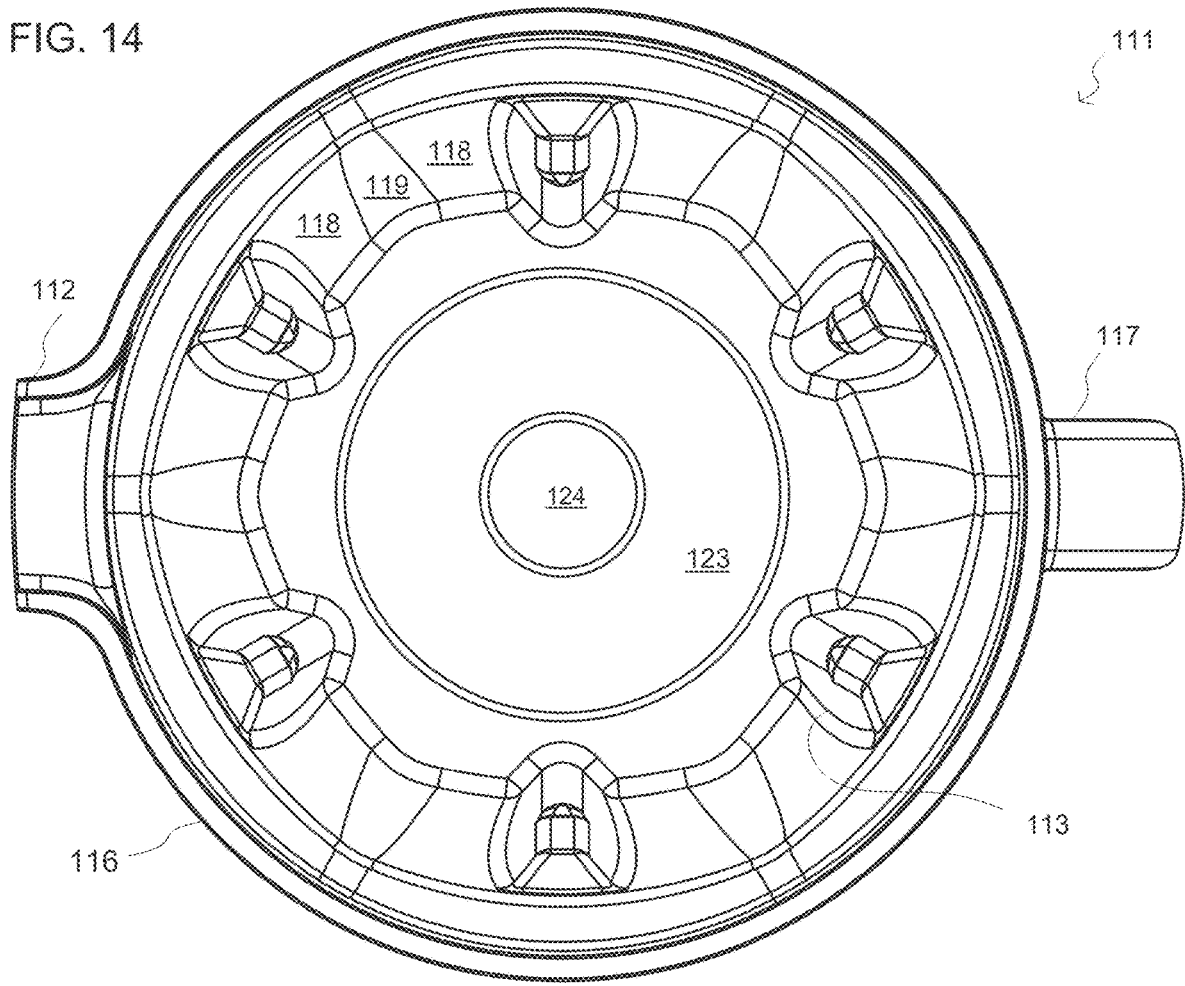
FIG. 14 is a top planar view of the jar according to one embodiment of the present invention.
Figure 15:
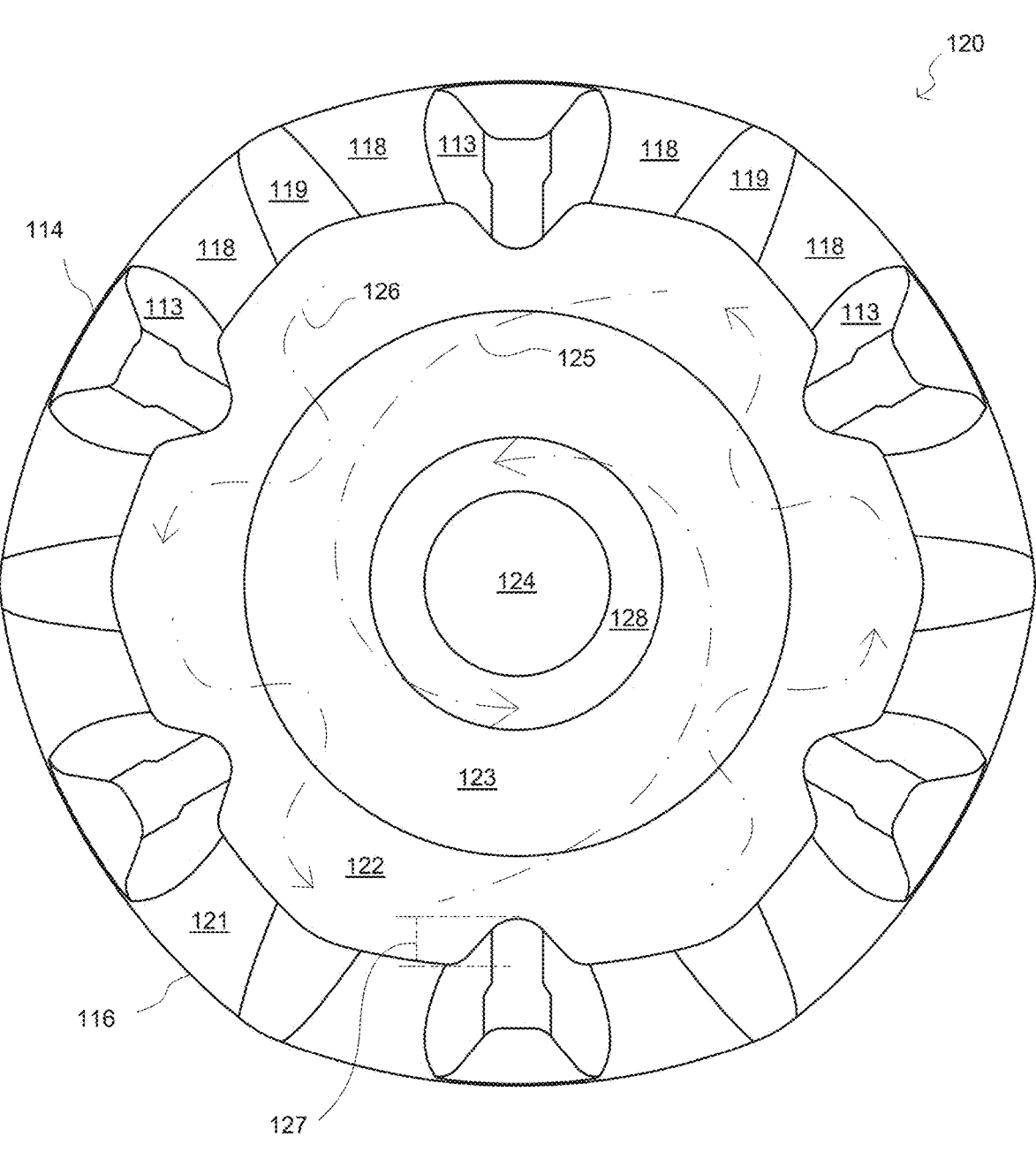
FIG. 15 is a diagrammatic illustration from a top planar view of the agitation and vortex patterns within the interior portion of a jar during use according to one embodiment of the present invention.

The jar assembly 110 has a jar body 111, measuring cup 130, and lid 140. Various aspects of the components of the jar assembly 110 according to various embodiments of the present invention will now be discussed with reference to FIGS. 11-22. FIG. 11 is a top planar view of a jar assembly 110 according to one embodiment of the present invention. FIG. 12 is a side planar view of a jar assembly 110 according to one embodiment of the present invention. FIG. 13 is bottom planar view of the jar body 111 according to one embodiment of the present invention. FIG. 14 is top planar view of the jar body 111 according to one embodiment of the present invention. FIG. 15 is a diagrammatic representation of the vortex 125 and agitation pattern 126 created by the blade assembly 200 within the interior portion 120 of the jar body 111 as seen from a top planar view.

Figures 16, 17:
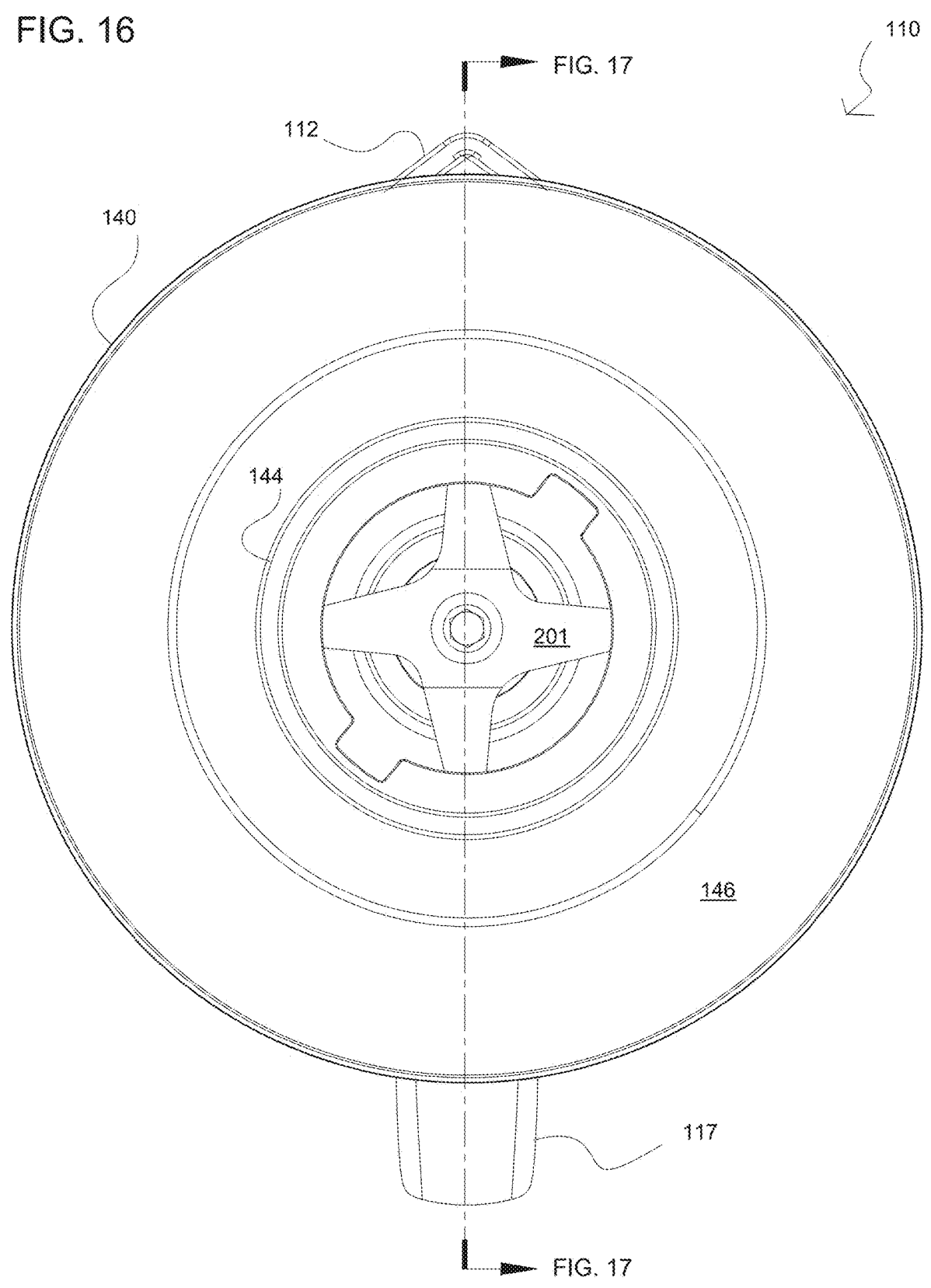
FIG. 16 is a top planar view of the jar according to one embodiment of the present invention.
FIG. 17 is a side cross-sectional view of the jar shown in FIG. 16, also showing a further diagrammatic illustration of the vertical agitation pattern and vortex pattern within the interior portion of a jar during use.
Figure 17:
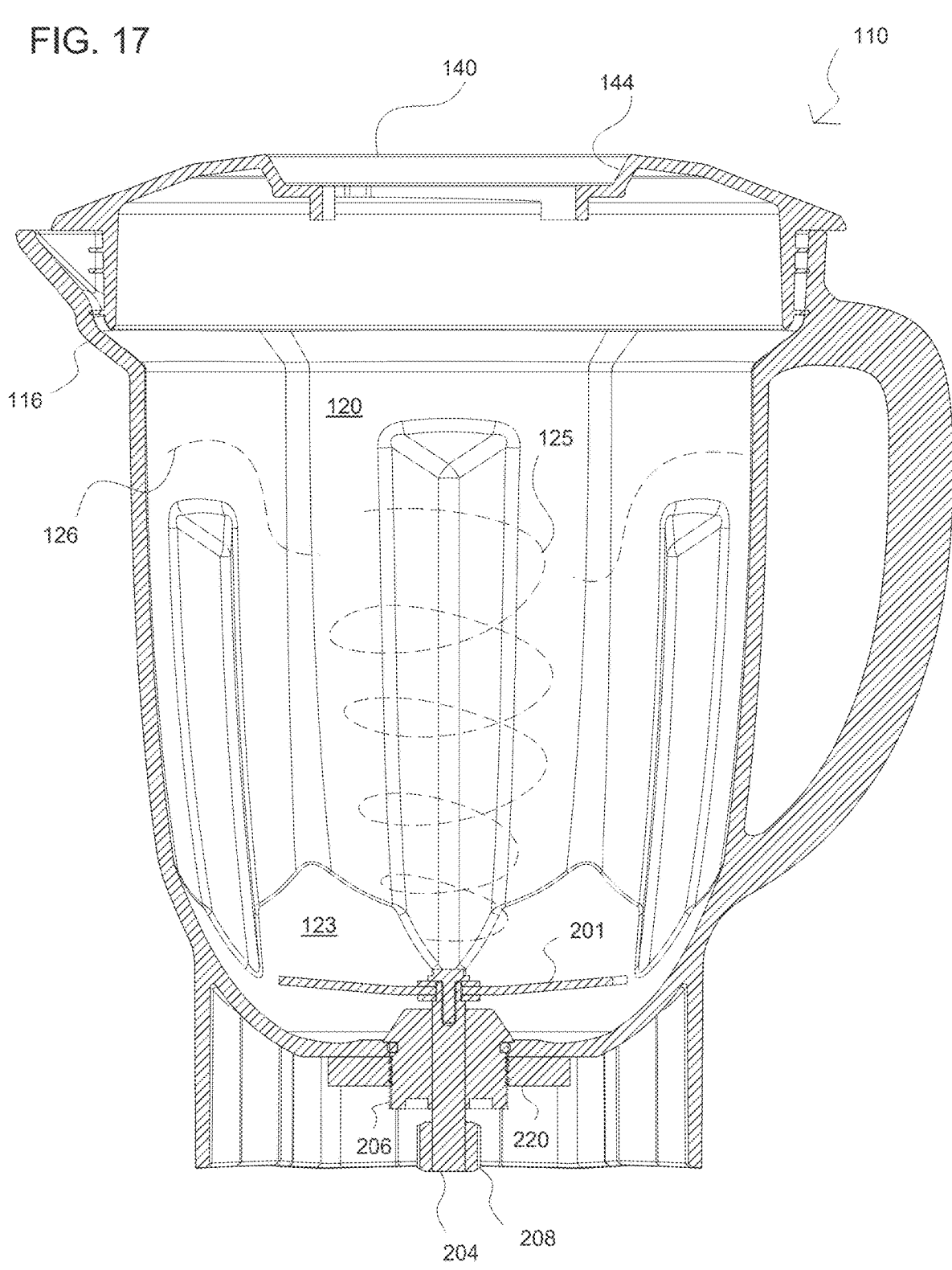
Figure 17A:
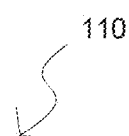
FIG. 17A is a rear planar view of the jar shown in FIG. 16.
Figure 18:
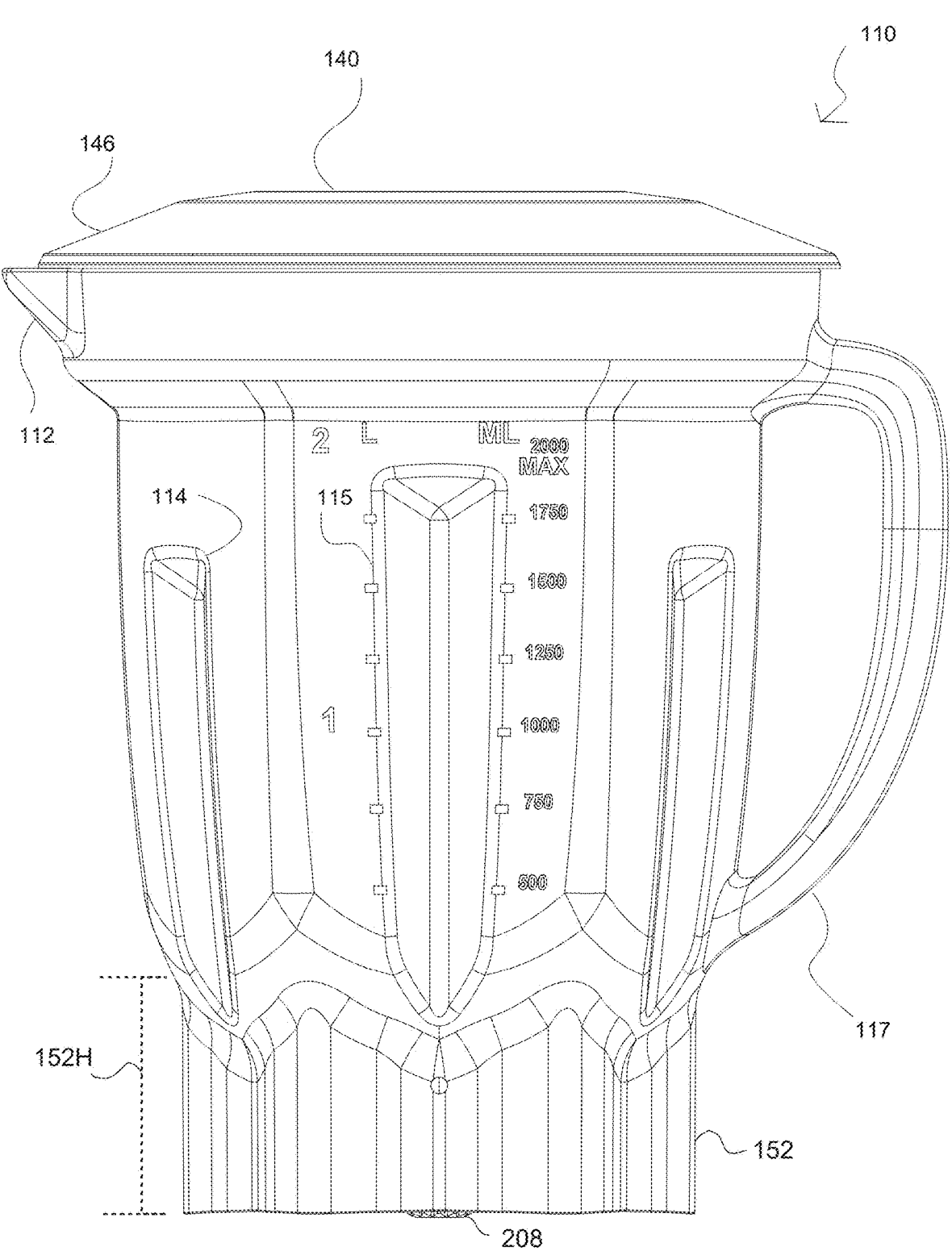
FIG. 18 is a side planar view of the jar, lid, and blade assembly according to one embodiment of the present invention.

FIG. 16 is a top planar view of another jar assembly 110 (sans cup 140) with the blade assembly 200 present. FIG. 17 is a side cross-sectional view of the jar shown in FIG. 16, also showing a further diagrammatic illustration of the vertical agitation pattern 126 and vortex pattern 125 within the interior portion 120 of a jar body 111 during operation. FIG. 17A is a rear planar view of the jar shown in FIG. 16. FIG. 17B is a cross-sectional slice of the jar shown in FIG. 17A. FIG. 17B is a cross-sectional slice of the jar shown in FIG. 17A. FIG. 17B is a cross-sectional slice of the jar shown in FIG. 17A. FIG. 18 is a side planar view of this same jar assembly 110.

Figure 19:
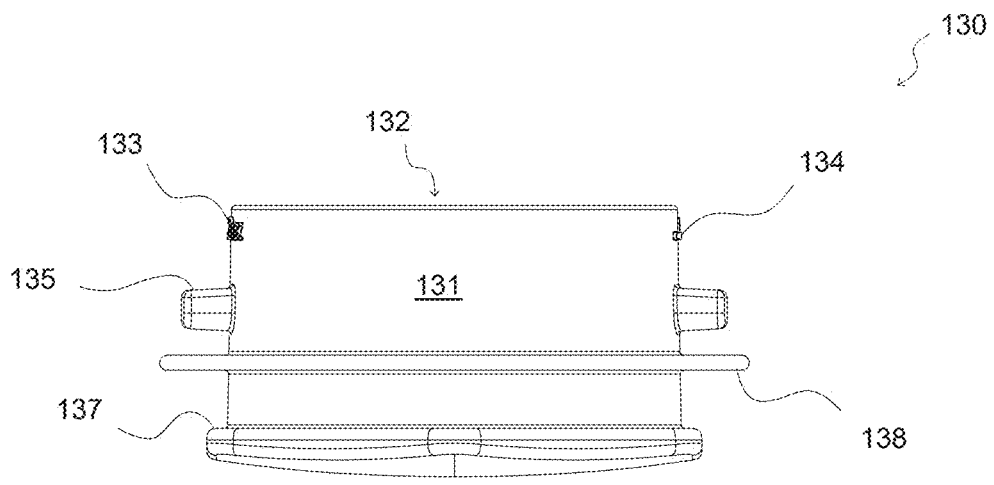
FIG. 19 is a side planar view of the cup according to one embodiment of the present invention.
Figure 20:
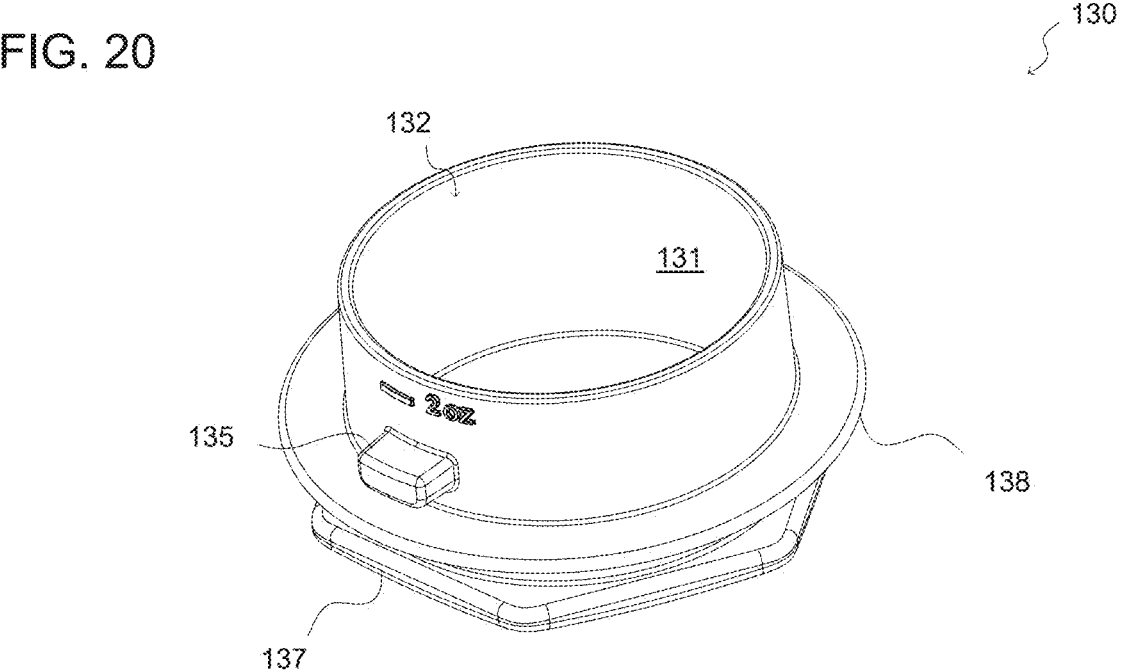
FIG. 20 is a bottom, side, front perspective view of the cup according to one embodiment of the present invention.

FIG. 19 is a side planar view of the cap/cup 130 according to one embodiment of the present invention. FIG. 20 is a bottom, side, front perspective view of the cap/cup 130 according to one embodiment of the present invention. FIG.

Figure 22:
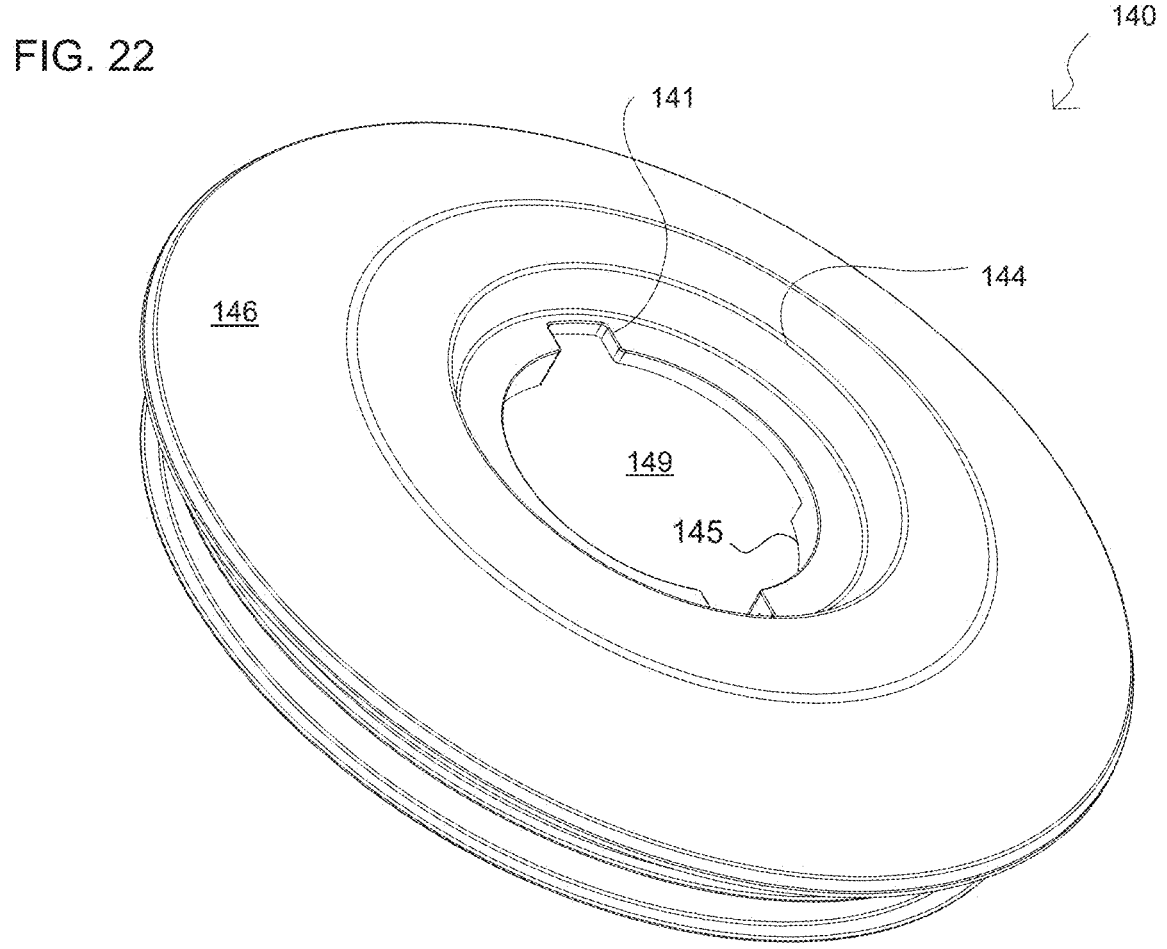
FIG. 22 is a top, side, front perspective view of the lid according to one embodiment of the present invention.
Figure 23:
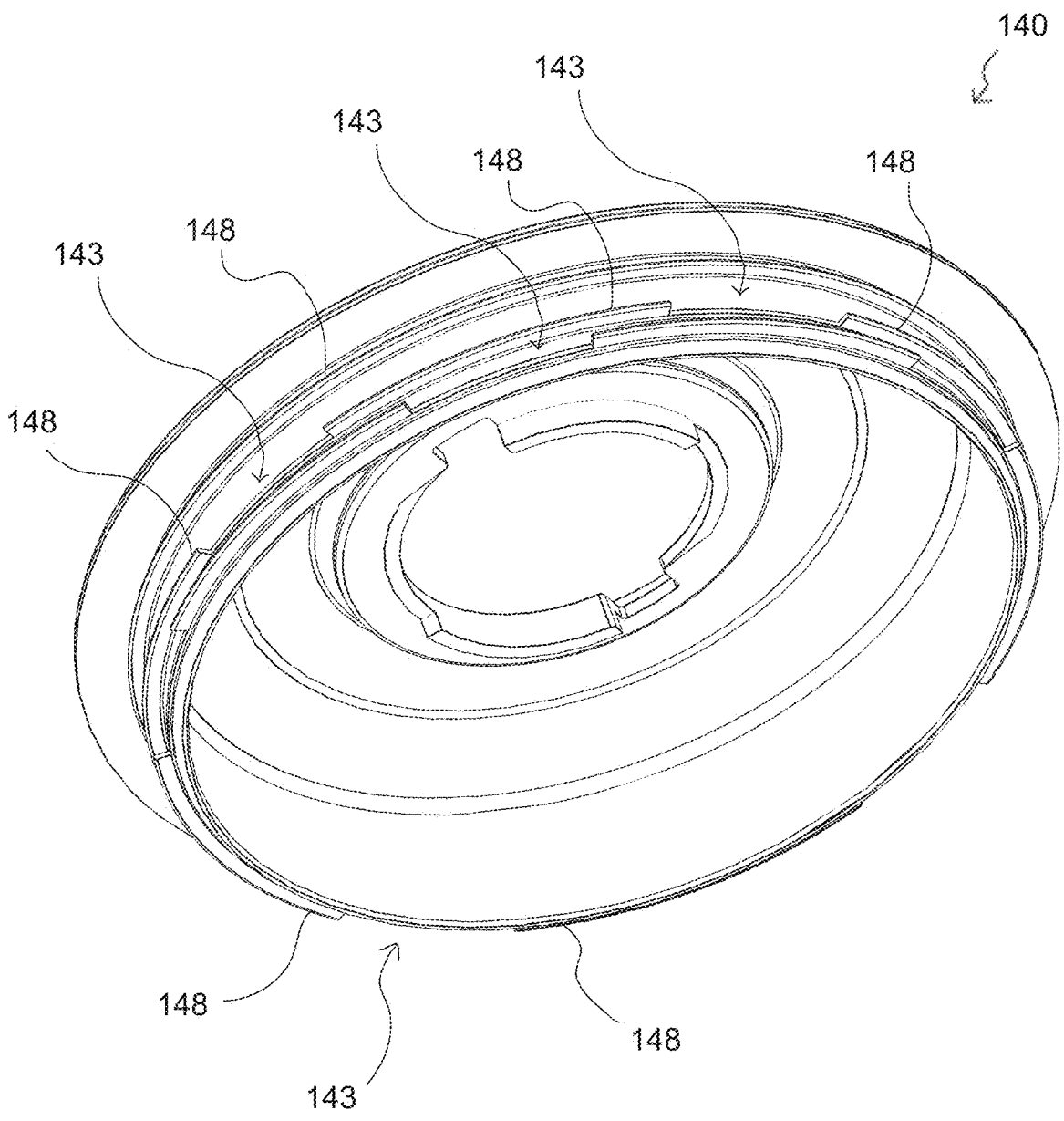
FIG. 23 is a bottom, side, front perspective view of the lid according to one embodiment of the present invention.

21 is a side planar view of the lid 140 according to one embodiment of the present invention. FIG. 22 is a top, side, front perspective view of the lid 140 according to one embodiment of the present invention. FIG. 23 is a bottom, side, front perspective view of the lid 140 according to one embodiment of the present invention showing an alternative staggered perforation 143 pattern.

The prior art focused on cylindrical or square shaped jar bodies 111 in order to increase ease of cleaning after use. However, this sacrifices efficiency, increases the necessary operating time, and results in a much less smooth blend as in a round jar, food swirls endlessly around the perimeter. Even in a square jar, the food swirls and then clumps in the four corners.

The present invention overcomes these obstacles by using an alternating profile 109 (when viewed from the top or bottom) for the internal portion of the jar shape to increase efficiency and still decrease clean up time. Beginning with a cylindrical portion 116, the jar body 111 transitions into an initial portion 121 with a hollow hexagonal shaped profile 109. This is followed by an intervening hollow hexagonal portion 122. Some embodiments have staggered ribs 114, 115 which creates a hollow octadecagon profile. This is followed by a hollow spherical (bowl) portion 123 with a circular profile 109. The hollow hexagonal internal portions 121, 122 have six sides which kick the outer material around the perimeter back towards the center.

As previously discussed with reference to the storage configuration, the jar body 111 generally has a height 111*h* between 100 to 300 mm, usually between 200 to 250 mm, and preferably 228 mm. An upper enlarged neck portion 116 of the jar 110 has a diameter 116*d* that may be in a range between 10-100 mm, usually between 20 to 70 mm, and preferably 182 mm. A first portion 121 of the jar 110 has a height 121*h* that may be in a range between 10-100 mm, usually between 20 to 70 mm, and preferably 114 mm. An intervening portion 122 of the jar 110 has a width 122*w* that is typically in a range between 10-100 mm, usually between 20 to 70 mm, and preferably 138 mm.

Integral with the jar body 111, a hexagonal external skirt 152 extends downwards from an upper portion of the bowl portion 123 with a height 152*h* that is in a range between 10-40 mm, usually between 20 to 30 mm, and preferably 28 mm. The hexagonal external skirt 152 at the base has a width 152*w* that is in a range between 90-200 mm, usually between 100 to 130 mm, and preferably between 108-122 mm.

In at least some embodiments, the skirt 152 has been shortened to increase the portability of the blender. In these embodiments, the jar body 111 generally includes a hexagonal skirt 152 extending downwards from a top of the bowl portion 123 with a height 152*h* that is in a range between 10-100 mm, usually between 40 to 60 mm, and preferably 55 mm.

The jar body 110 is a generally hollow shell beginning with a cylindrical neck portion, a first working interrupted hexagonal portion 121, a second working interrupted hexagonal portion 122, and a third working bowl portion 123. The internal portion 120 of the jar body 110 has a radius/width that is larger along an upper portion and smaller along a lower portion by an increase in a range between 2-1.2 times larger, usually at least 1.4 times larger, and preferably 1.5 times larger.

The jar body 110 has an enlarging neck portion 116 that is a generally hollow expanding cylindrical shell with a diameter that is larger along an upper portion and smaller along a lower portion. Specifically, the largest diameter of along an uppermost portion of the neck portion 116 is in a range between 100-300 mm, usually between 150 to 170 mm, and preferably 153 mm. While the diameter along the lower portion is in a range between 100-300 mm, usually between 100 to 150 mm, and preferably 136 mm.

The jar has a first opening along the upper portion, and a second opening along the bottom portion. The opening along the bottom portion enables the blade assembly access to the interior portion of the jar. The opening has a diameter in a range between 10-100 mm, usually between 20 to 50 mm, and preferably 28 mm. The spout along the first opening along the upper portion has a width in a range between 10-100 mm, usually between 20 to 50 mm, and preferably 40 mm. The spout has a depth in a range between 1-50 mm, usually between 2 to 20 mm, and preferably 14 mm.

The handle 117 extends outward from the side walls 118 of the jar body 111 and vertically upwards parallel to the jar body walls 118. The handle 117 has a height in a range between 100-200 mm, usually between 150 to 170 mm, and preferably 162 mm. The handle 117 has a depth in a range between 1-10 mm, usually between 2 to 5 mm, and preferably 3 mm. The handle 117 has a width in a range between 1-100 mm, usually between 20 to 40 mm, and preferably 30 mm. The handle 117 has a thickness in a range between 5-50 mm, usually between 10 to 20 mm, and preferably 14 mm. There are a range because the handle tapers at the bottom.

In another embodiment the handle 117 extends outward from the side walls 118 of the jar body 111 and vertically upwards parallel to the jar body walls 118. The handle 117 has a height in a range between 100-200 mm, usually between 140 to 160 mm, and preferably 150 mm. The handle 117 has a depth in a range between 1-10 mm, usually between 1 to 5 mm, and preferably 3 mm. The handle 117 has a width in a range between 1-100 mm, usually between 10 to 50 mm, and preferably between 26-30 mm. The handle 117 has a thickness in a range between 5-100 mm, usually between 10 to 50 mm, and preferably 10-15 mm.

According to some embodiments, the bowl portion 123 is a rounded bowl shape at a bottom portion of the jar body 111 to increase blending performance and reduce blade jams in comparison to prior art models. Even with these embodiments, despite the generally rounded bowl shape 123 at the bottom of the jar body 111, the bottom surface of the interior skirt portion of the jar has a flattened portion 128 adject the hole 124 at the bottom of the jar body 111. This flattened portion 128 engages with the blade nut 220 for securing the blade assembly 200 to the jar body 111. The blade nut 220 also has a larger engaging surface area than prior art models. The blade nut 220 has an exterior radius of 31.7 mm and an interior radius of 27 mm, which results in an engaging surface area of 2,330 mm². The blade nut 220 has a height of 7 mm.

In some embodiments, the spout 117 has a square active surface, in other embodiments, the spout 117 has a triangular active surface. The triangular shape focuses the stream coming off the top of the jar body 111. The user can tilt the lid 140 partially to only allow liquids. In other embodiments, a barred window is provided in a portion of the wall of the lid 140 to allow the user to strain the food so that only liquids are allowed to exit to the spout 117.

Staggered rib heights with a first set of ribs 114 and a second set of ribs 115 allow for a more ergonomic fit of the housing of the base 300 during storage and increased blending performance and product mixing during use. The staggered rib heights encourage a vertical agitation pattern 126 (as seen in FIG. 17) in addition to the horizontal agitation pattern 126 (as seen in FIG. 15).

Specifically, FIG. 15 shows a diagrammatic representation of the vortex 125 and agitation pattern 126 created by the blade assembly 200 within the interior portion 120 of the jar body 111. Though not shown here for clarity, during operation the blade assembly 300 will extend into the interior portion 120 of the jar body 111. The blades 201 spin in a circular motion which creates a vortex 125 in the fluid within the interior portion 120. The vortex 125 causes a vacuum at the center of the jar body 111, which pulls the fluids down toward the bottom center 128. The fluid follows the blade pattern in a circular motion around the interior portion 120 of the jar body 111. As the fluid circulates around the interior portion 120 of the jar body 111, the ribs 113 ingress 127 inwards towards the center, thereby disrupting the fluid pattern and creating an agitation pattern 126. A similar disruption of the fluid path occurs on a vertical level as well due to the variable heights of the rib sets 114, 115 (vertical disruption 126, seen in FIG. 17).

The jar body 111 has an interior working volume within the interior portion 120 that is at least 64 fl oz (2 quarts or 1,893 mL) and has measurement indicators on a left side which correspond to the imperial measurement system counting up to at least 64 fl oz. The jar body 111 has an interior working volume within the interior portion 120 that is at least 2,000 mL and has measurement indicators on a right side which correspond to the metric measurement system, marking up to at least 2000 mL (2 L, 67.6 fl oz, or 2.11 quarts). The indicators do not measure the entire interior volume of the jar body 111. The jar body 111 has a total interior volume that is at least 90 fluid ounces, usually at least 100 fl oz, and preferably 103 fl oz (3.2 quarts or 3,046 mL).

The first set of ribs 14 have a height that is in a range between 100-200 mm, usually between 120 to 130 mm, and preferably 126 mm. The second set of smaller ribs 15 have a height that is in a range between 10-200 mm, usually between 100 to 120 mm, and preferably 107 mm. The first set of ribs 14 ingress 127 for a diameter/width that is in a range between 1-15 mm, usually between 5 to 10 mm, and preferably 8 mm. The second set of ribs 15 ingress 127 for a diameter/width that is in a range between 1-10 mm, usually between 5 to 10 mm, and preferably 7 mm.

An upper enlarged neck portion 116 of the jar 110 has a diameter 116d that may be in a range between 100-300 mm, usually between 150 to 250 mm, and preferably 182 mm. A first portion 121 of the jar 110 has a first diameter that equals the diameter 116d of the enlarged neck portion 116. The first portion 121 transitions to a generally hexagonal shape and has a second smaller width that may be in a range between 100-300 mm, usually between 120 to 170 mm, and preferably 150 mm.

An intervening portion 122 of the jar 110 has a first upper diameter that equals the second lower diameter of the first portion 121. The intervening portion 122 has a second lower diameter that may be in a range between 100-300 mm, usually between 120 to 170 mm, and preferably 130 mm. A bowl portion 123 of the jar 110 has a first upper diameter that equals the second lower diameter of the intervening portion 122. The bowl portion 123 of the jar 110 has a second lower diameter that may be in a range between 10-100 mm, usually between 50 to 80 mm, and preferably 68 mm.

FIGS. 19-22: Lid 140 & Measuring Cup 130

The jar assembly 110 includes a measuring cup 130 and lid 140. FIG. 19 is a side planar view of the cap 130 according to one embodiment of the present invention 100. FIG. 20 is a bottom, side, front perspective view of the cup 130. The 2 oz measuring cup 130 also functions as a removable cap 130 which seals the lid aperture 149 during use. (As these functions require inverse positioning, the bottom of cup is the top of the cap.) Locking tabs 135 are provided on exterior facing portions of opposing side walls 131. These locking tabs 15 enable the cap 130 to be locked into place within the aperture 149 of the lid 140 when the locking tabs 135 engage with the locking notch 141 of the lid 140.

These locking tabs 135 are generally separated from each other by an angle in a range between 90-270 degrees apart, usually between 145 to 215 cm, and preferably located 180 degrees apart. These locking tabs 135 are generally located at a distance apart from a rim of the cup that may be in a range between 1-100 mm, usually between 2 to 10 mm, and preferably 10 mm. The locking tabs may have a width that is in a range between 1-50 mm, usually between 10 to 15 cm, and preferably 12 mm. The locking tabs may have a depth that is in a range between 1-30 mm, usually between 1 to 10 mm, and preferably 6 mm. The locking tabs may have a thickness that is in a range between 1-10 mm, usually between 1 to 6 mm, and preferably 3 mm.

The cap 130 may have a height that is in a range between 1-100 cm, usually between 20 to 50 cm, and preferably 42 mm. The cap 130 may have a diameter that is in a range between 1-10 mm, usually between 4 to 8 cm, and preferably 6 cm. The cap 130 may have walls 131 with a thickness that is in a range between 1-10 mm, usually between 2 to 5 mm, and preferably 3.3 mm. The cap 130 may have a bottom with a thickness that is in a range between 1-10 mm, usually between 2 to 5 mm, and preferably 4.5 mm.

There are measurement indicators 133, 134 on the exterior facing portions of the walls 131. In one embodiment, these indicators 133 are imperial measurements, e.g., 1 oz, 2.5 oz, and are present on a first side wall 131, between the two locking tabs. On an opposing side wall 131, further indicators 134 are metric measurements, e.g., 50 ml, and 75 ml.

A grip 137 extends outwardly around the exterior of the top of cap 130. The grip 137 is displaced from the rim of the cup 130 in a range between 1-100 mm, usually between 10 to 50 mm, and preferably 38.5 mm. The grip 137 may have a hexagonal shape with a width (extending outwards from the cup 130) that is in a range between 1-50 mm, usually between 2 to 20 mm, and preferably a range of 3-7 mm. The grip 137 may have a thickness that is in a range between 1-50 mm, usually between 1 to 20 mm, and preferably 5 mm. This grip 137 extends along the outer perimeter of the top of the cap (bottom of the cup). The top of the cap 130 may be flat, or may have a slight dome for ease of gripping, with the logo embossed in it. The center half of the top of the cup is flattened in one embodiment. The cup is removable from the lid is to allow for the addition of ingredients while the blender is running.

A sealing flange 138 extends outwardly around the exterior of the walls 131 of the cap 130 displaced from the rim of the cup 130 more than half the height, but also displaced from the grip 137. During use, the sealing flange 138 ensures that liquids are not allowed to escape from the aperture 149 of the lid 140. The seal 138 may have a thickness that is in a range between 1-50 mm, usually between 1 to 20 mm, and preferably 2 mm. The seal 138 may have an overall diameter that is in a range between 1-50 mm, usually between 10 to 40 mm, and preferably 35 mm. However, the seal 138 only extends from the wall for a radial distance that is in a range between 1-20 mm, usually between 5 to 14 mm, and preferably 9 mm.

Figure 21:
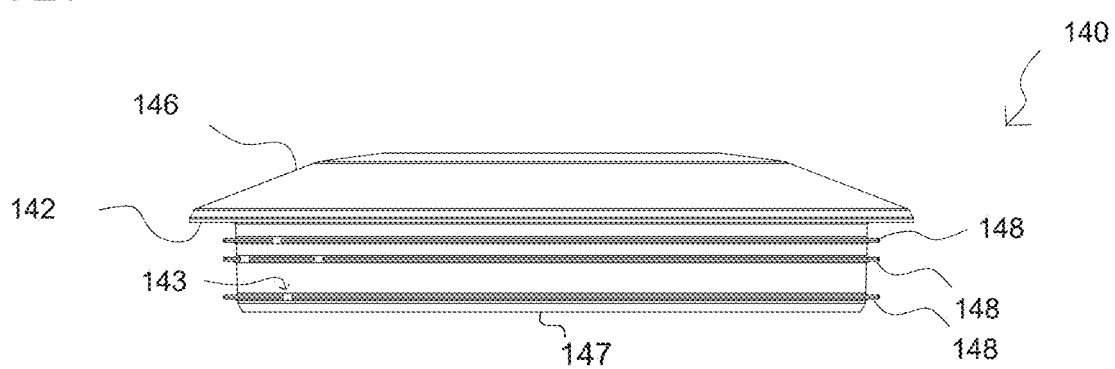
FIG. 21 is a side planar view of the lid according to one embodiment of the present invention.

As stated, the cup 130 sits inside an aperture 149 within an inset portion 144 of the lid 140. The depth of the inset 144 generally be sufficient such that an interior bottom portion of the measuring cup aligns with a height of a curvature of the sloped roof of the lid 140. FIGS. 21 through 23 take a closer look at the lid 140. FIG. 21 is a side planar view of the lid 140 according to another embodiment. FIG. 22 is a top, side, front perspective view of the lid 140 according to another embodiment of the present invention.

In general, the lid 140 functions to prevent the fluids from rapidly escaping the interior portion 120 of the jar body 111 during operation due to the intense speeds provided by the blade assembly 200. The lid 140 has a sloped roof 146 to facilitate any fluids pushed up against the roof of the lid 140 to drain back into the interior portion 111 of the jar body 120. A vertical wall 147, having a diameter less than a diameter of the interior of the neck 116, extends downwards from the roof of the lid 140 in order to ensure that these fluids do not drip outside of the jar body 120.

An aperture 149 at the center of the lid 140 is sized to engage the measuring cup 130 during operation. Locking notches 141 facilitate engagement with the locking tabs 135 of the measuring cup 130. Running counterclockwise around the aperture 149 from each locking notch 141 are inclined ramps 145 which facilitate a locking engagement with the locking tabs 135 of the measuring cup 130 as the measuring cup 130 is twisted into a locking configuration with the lid 140.

There are three sealing rings 148 which extend radially outwards from the vertical (axial) wall 147 on the lid 140. Each sealing ring 148 may be solid all around the perimeter of the wall 147. Alternatively, the top sealing ring 148 may be solid all the way around while the bottom two sealing rings have alternating cuts/perforations 143. The sealing ring 148 stops the product from splashing out during blending, while the alternating perforations 143 allow ventilation for evaporation during storage. During storage, the measuring cup 140 would prevent the lid 140 from pushing down far enough to let the solid top sealing ring 148 to seat and form a waterproof seal within the interior portion 120 of the jar body 111.

Alternatively, smaller perforations 143 may be provided in a staggered pattern along two sealing rings 148. The staggered nature of the smaller perforations 143 would ensure that any splashing out would be prevented during operation while also preventing a waterproof seal forming within the interior portion 120 of the jar body 111.

In some storage configurations, when the embodiment includes a lid 140 having perforations 143, these offset perforations 143 will prevent the lid 140 from completely waterproofing the interior portion 120 of the jar assembly 110. In other embodiments the cup abuts against the base 300, or is otherwise kept in an offset position, which would likewise keep the lid 140 from waterproofing the top sealing ring 138 entirely. This also prevents moisture from being trapped during storage.

The lid 140 is generally comprised of thick thermoplastic rubber and has a diameter 140d that may be in a range between 100-1000 mm, usually between 200 to 250 mm, and preferably 191 mm. The walls 147 may have a height that may be in a range between 1-100 mm, usually between 10 to 50 mm, and preferably 24 mm. The walls 147 may begin to extend downwards from the roof 146 at a radial distance from the center of the lid 140 in a range between 100-200 mm, usually between 120 to 180 mm, and preferably 166 mm.

The aperture 149 will always have a radius just slightly greater than a radius of the cup walls 131. The aperture 149 may have a radius in a range between 10-100 mm, usually between 20 to 80 mm, and preferably 61 mm. The central inset 144 which holds the aperture 149 may have a height that may be in a range between 1-10 mm, usually between 2 to 5 mm, and preferably 8.5 mm. The locking notches 141 may have a width that may be in a range between 1-30 mm, usually between 5 to 20 mm, and preferably 12.8 mm. The locking notches 141 may have a depth that may be in a range between 1-30 mm, usually between 2 to 10 mm, and preferably 7 mm. The locking notches 141 may be located 180° degrees apart along the inset 144 on the perimeter of the aperture 149 of the lid 140.

Figure 24:
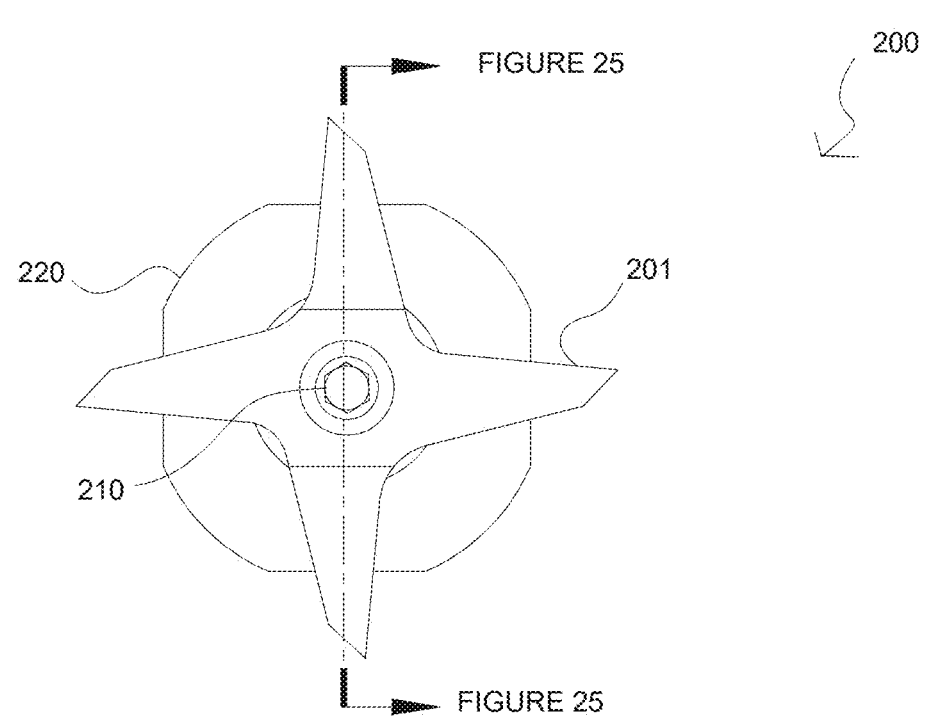
FIG. 24 is a top view of the blade assembly according to one embodiment of the present invention.
Figure 25:
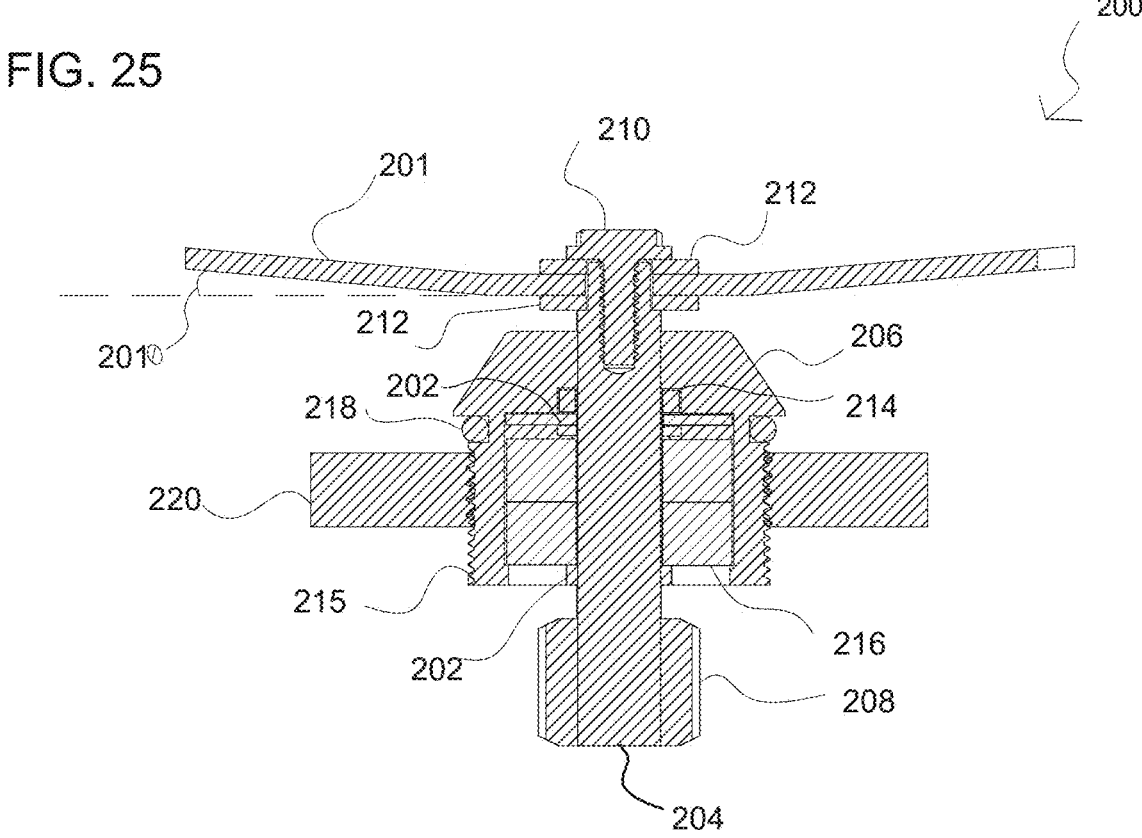
FIG. 25 is a cross-sectional view of the blade assembly according to the embodiment of the present invention shown in FIG. 24.

FIGS. 24-25: Blade Assembly 200

FIGS. 24 and 25 take a closer look at the blade assembly 200 of the present invention. FIG. 24 is a top view of the blade assembly 200, and FIG. 25 is a cross-sectional view of the same blade assembly 200. The blade assembly 200 of the present invention 100 generally contains all stainless-steel components.

The blade assembly 200 necessarily contains blades 201 affixed to the drive shaft 204. While multiple blade components are possible, the embodiments shown here focus on a single blade 201 that is star-shaped, i.e., having multiple sharpened arms extending from a single center. Each arm blade component is sharpened on the counterclockwise leading edge, squared off on the back, reverse, clockwise edge. Each arm blade component is angled from the horizontal in order to create the vortex 125 while spinning. A square hole in the center of the blade allows the blade to be affixed onto the drive shaft 204.

The drive shaft 204 acts as a motor shaft adaptor for the blades 201 using a male coupler fitting which engages with the coupler assembly 786. The drive shaft may have a hex end at a bottom, with a square end at the top tapped for matingly engaging a button head stainless steel machine screw. Circlips 202 are provided to secure the rotating drive shaft 204, bearings, and gears, ensuring smooth and efficient operation.

A drive shaft bearing assembly 206 may be flanged on a first proximal end and threaded on a distal end (with respect to blades 201). This bearing assembly 206 may be any mechanical assembly that reduces friction between the stationary jar body 111 component and the rotating drive shaft 204. The bearing assembly 206 shown here has inner tracks 216 to reduce the transmission of friction from the drive shaft 204 to the jar body 211.

A food grade gasket 218 is provided to prevent contamination during operation of food processing and offers superior sterility and flexibility over other gaskets. A lip seal 214 is also provided along the bearing 206. An enlarged surface area nut 220 is provided for engaging the flat center portion 128 of the jar body 111. This larger surface area of the blade nut 220 distributes more of the rotational stress over more of the bottom of the jar and improves jar life. 28M with 34 mm flange.

The square hole may have a width that may be in a range between 1-30 mm, usually between 2 to 10 mm, and preferably 6 mm. The drive shaft 104 may have a length that may be in a range between 10-100 mm, usually between 20 to 60 mm, and preferably 46 mm. The drive shaft 104 has a diameter that may be in a range between 1-20 mm, usually between 4 to 10 mm, and preferably 8 mm. The double-D end of the drive shaft 104 has a height that may be in a range between 1-10 mm, usually between 2 to 5 mm, and preferably 8 mm. The square top end of the drive shaft 104 has a width that may be in a range between 1-20 mm, usually between 2 to 10 mm, and preferably 5.9 mm.

The retention fastener 210 has a length that may be in a range between 1-20 mm, usually between 2 to 10 mm, and preferably 10 mm. The retention fastener 210 has a nominal thread size that may be in a range between M1-M5, usually between M2 to M4, and preferably M4. The retention fastener 210 has a flange diameter that may be in a range between 1-20 mm, usually between 2 to 10 mm, and preferably 10 mm. The drive shaft seal has a diameter that may be in a range between 1-100 mm, usually between 10 to 40 mm, and preferably 22 mm.

The food grade gasket 218 has an inner diameter that may be in a range between 1-100 mm, usually between 10 to 40 mm, and preferably 25 mm. The food grade gasket 218 has an outer diameter that may be in a range between 1-100 mm, usually between 10 to 50 mm, and preferably 30 mm. The food grade gasket 218 has a thickness that may be in a range between 1-10 mm, usually between 1 to 5 mm, and preferably 2.5 mm.

The larger surface area blade nut 220 has a flange with a width that may be in a range between 10-100 mm, usually between 20 to 50 mm, and preferably 63 mm. The larger surface area blade nut 220 has a nominal thread size that may be in a range between M10-M50, usually between M20 to M40, and preferably M28.

FIGS. 26-33: Base 300

Figure 26:
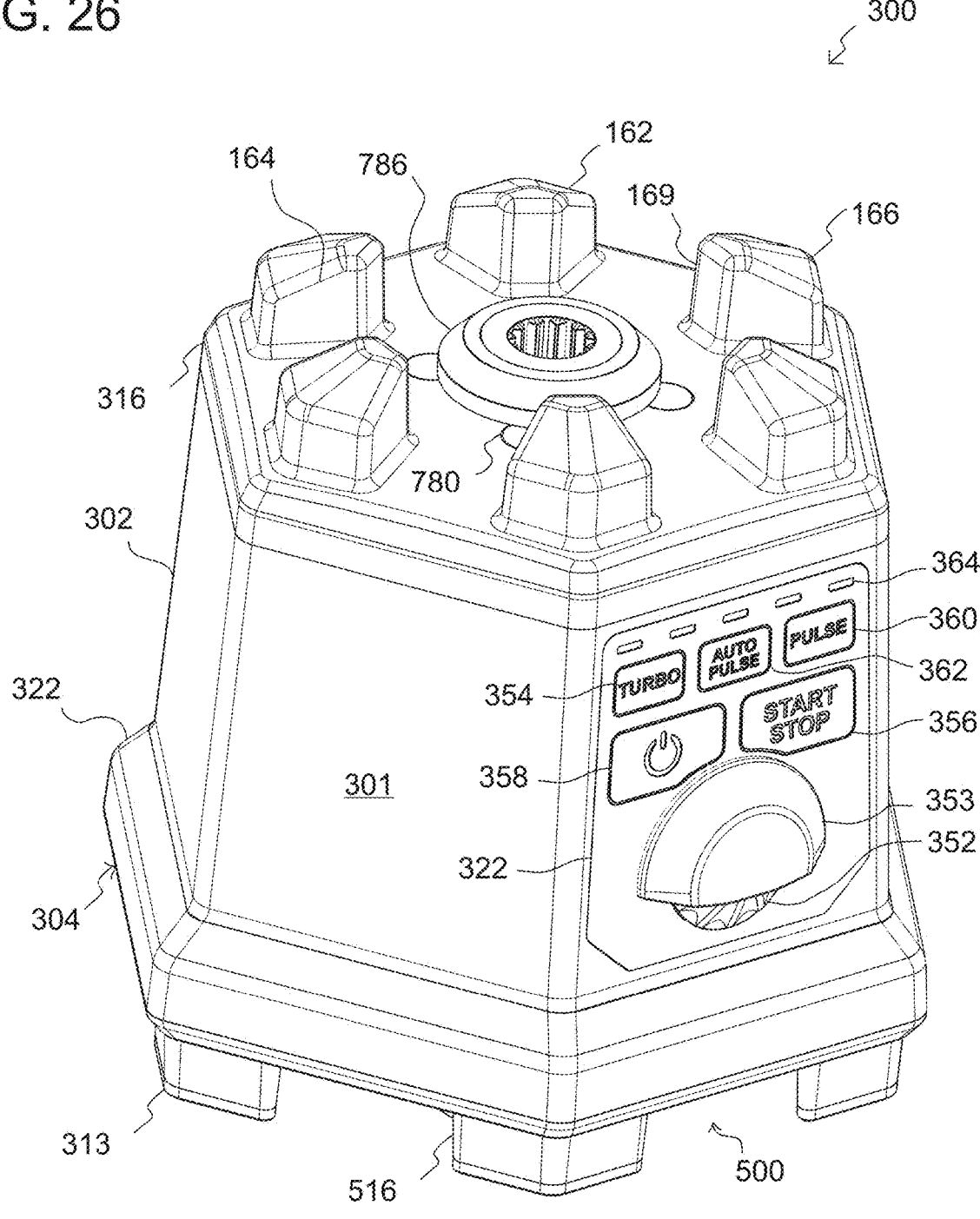
FIG. 26 is top left front perspective view of the base assembly according to the embodiment of the present invention shown in FIG. 3.
Figure 27:
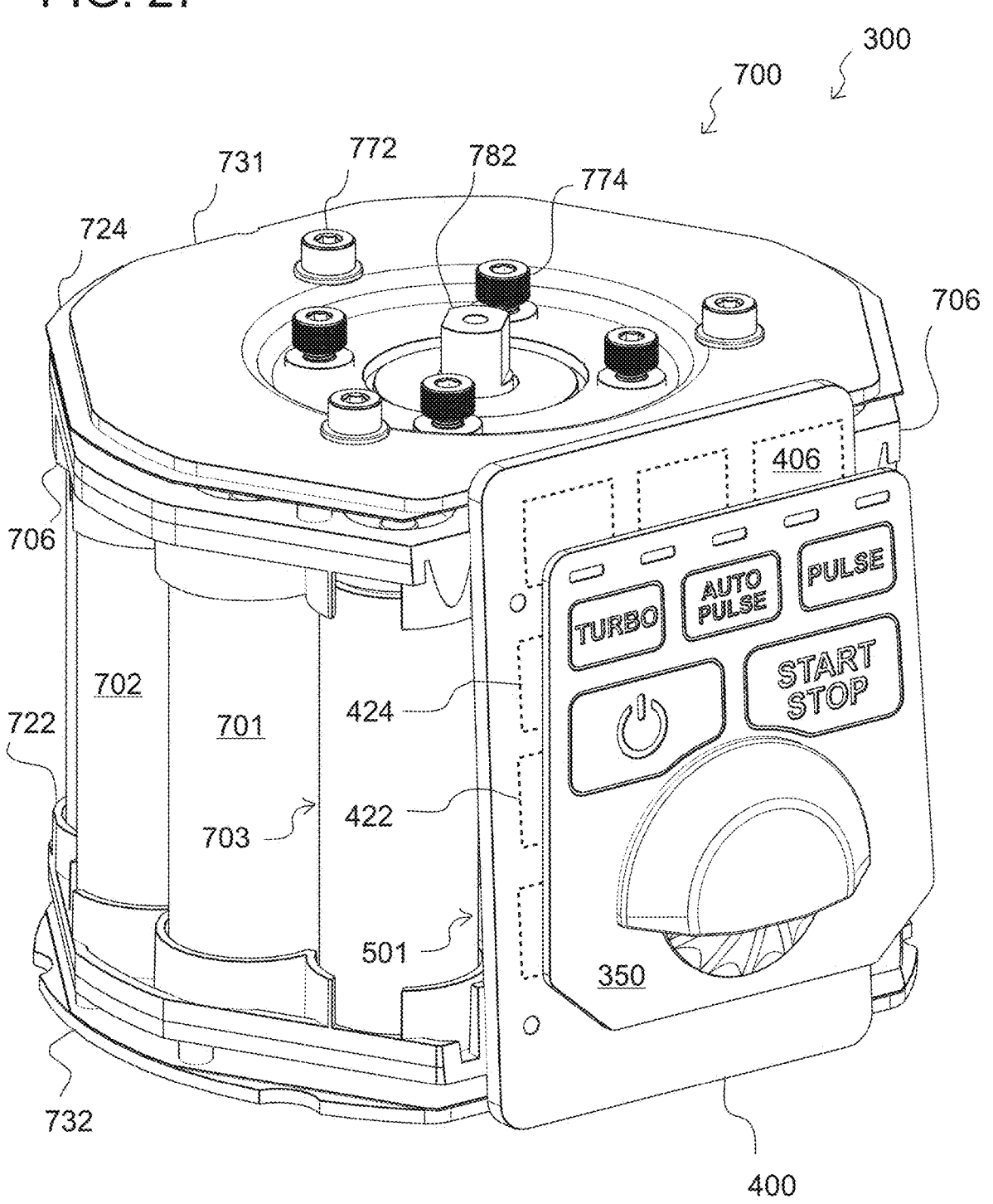
FIG. 27 is top left front perspective view of some internal components of the base assembly according to one embodiment of the present invention.
Figure 28:
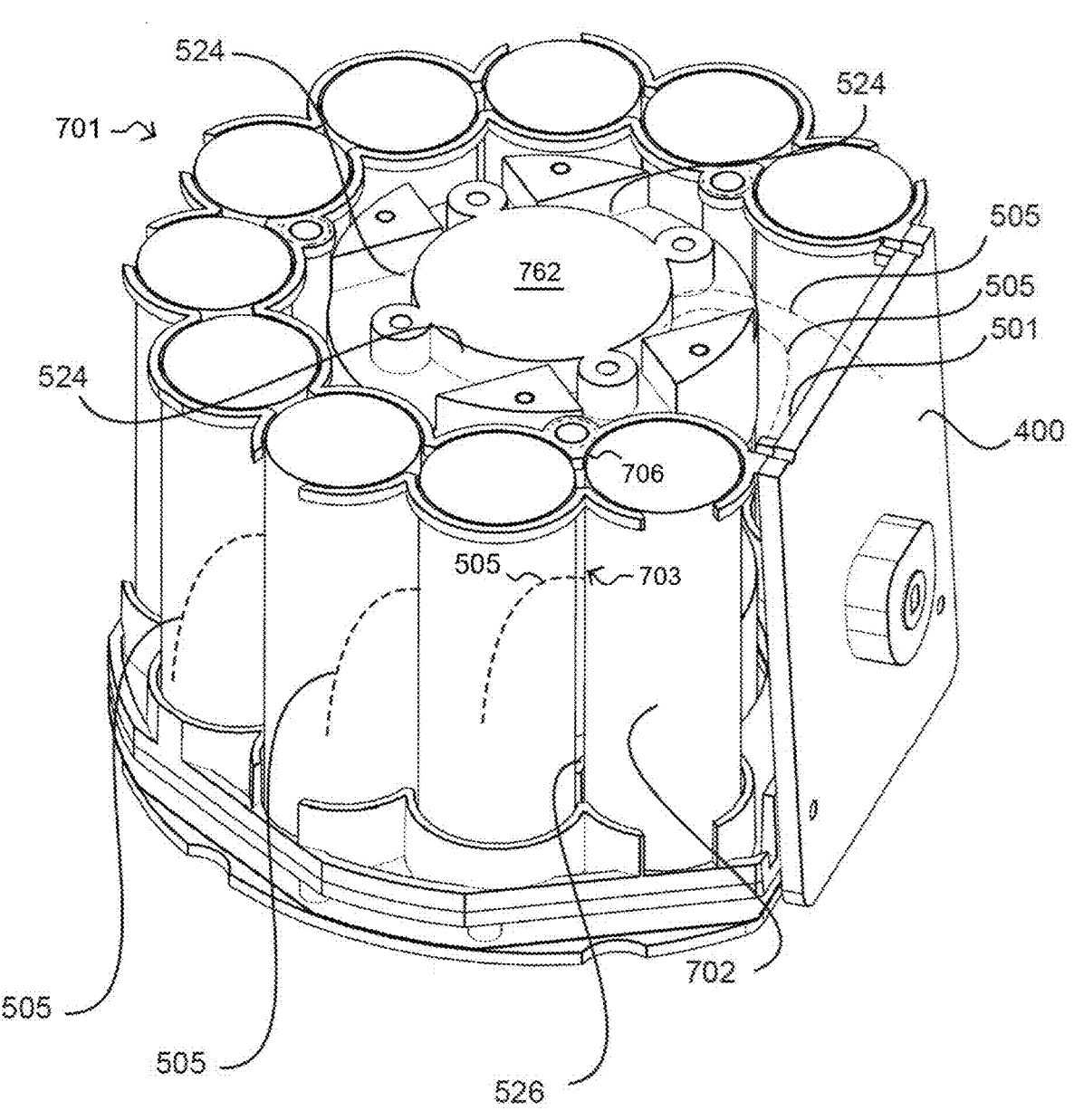
FIG. 28 is top left front perspective view of the battery pack and PCB within the base assembly according to one embodiment of the present invention.
Figure 29:
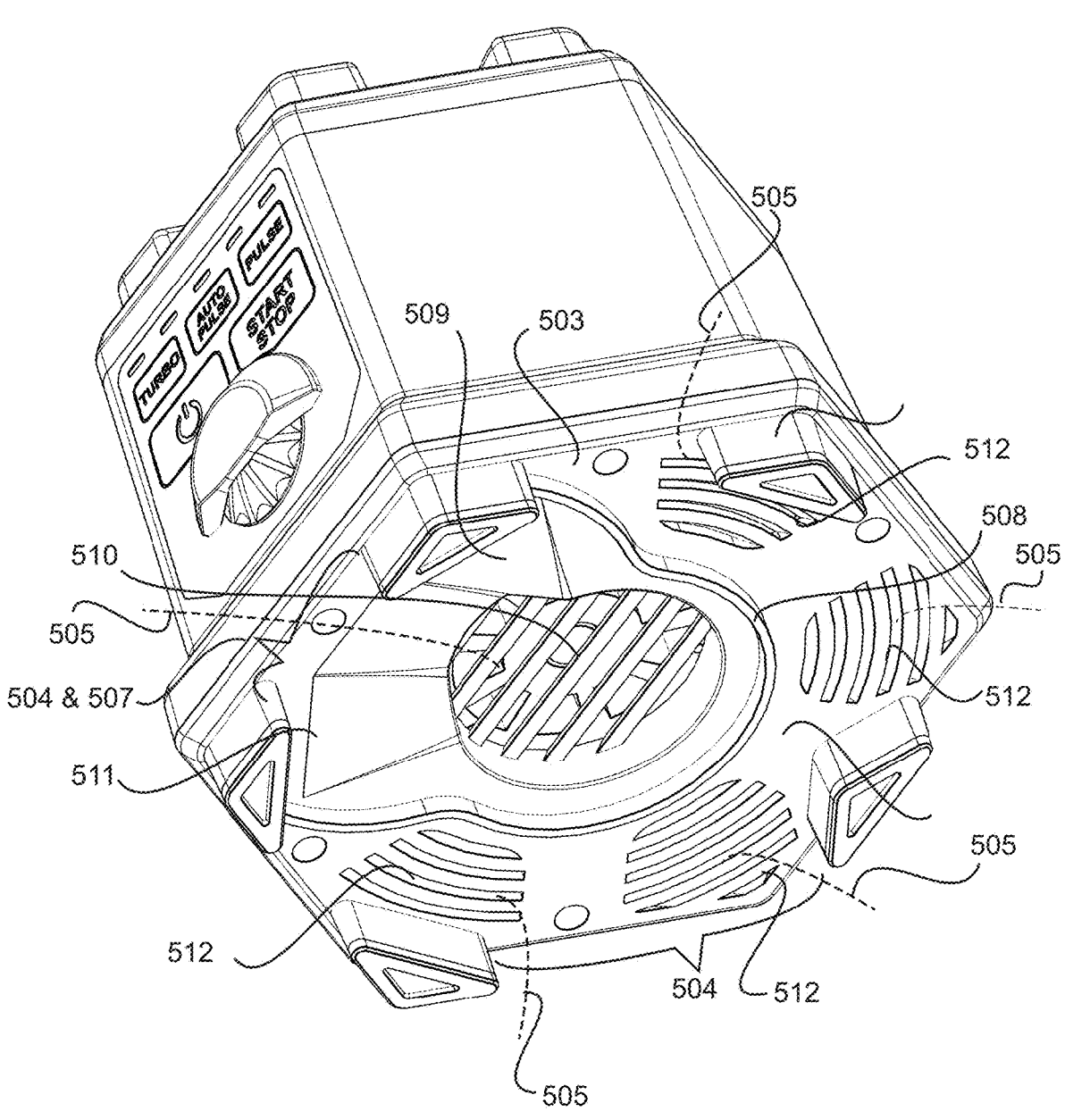
FIG. 29 is bottom right front perspective view of the base assembly according to the embodiment of the present invention shown in FIG. 3.
Figure 30:
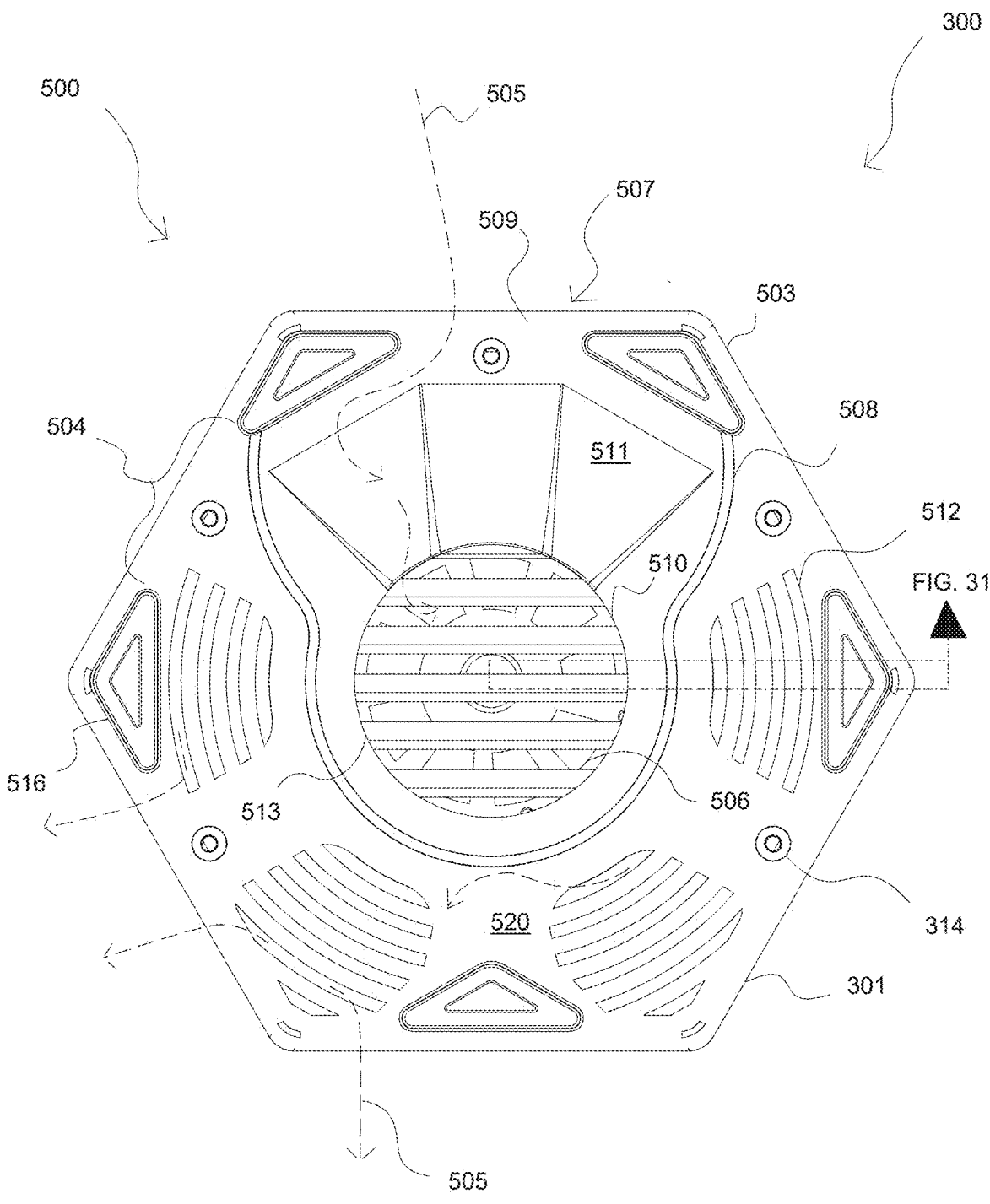
FIG. 30 is bottom view of the base assembly, showing portions of the cooling system according to one embodiment of the present invention.

Turning now to FIGS. 26-31 are various views of the base 300 and the components housed within the base 300: the power assembly 700, including battery pack 701, and cooling assembly 500 according to various embodiments of the present invention. Specifically, FIG. 26 is a top-left-front perspective view of the base assembly 300 according to one embodiment of the present invention. FIGS. 27-28 focus on various internal components of the base assembly 300, and FIGS. 30 and 31 focus on showcasing portions of the cooling system 500.

As previously discussed, an uppermost portion 316 of the base assembly 300 supports irreversibly integrated bosses 160 which form part of the joining assembly. The bosses 160 each have an irregular pentagonal prismatic shape with five walls 162, 164, 169 extending upwards from the uppermost portion 316 of the base assembly 300. The exterior facing walls 162 meet along exterior vertices 166, and also abut against radial walls 164 along vertices which are less than ninety degrees. These radial walls 164 extend inwards until abutting against the interior facing wall 169. A gap remains between the interior facing walls 169 and the coupler 786.

In one embodiment, the uppermost portion 316 is a removable cover that facilitates ease of washing this portion of the system 100. In the embodiment shown in FIG. 26, the uppermost portion 316 is irreversibly connected with the top housing shell 302, and instead, smaller coatings 780 are provided. These coatings 780 are still removable, this time so as to easily access the screws underneath.

The base 300 has a generally hexagonal prismatic shape with a top shell 302 with walls 301 connected to a bottom shell 304. The top shell 302 is secured to the bottom shell 304 with retention screws 314. Attached to the bottom shell 304 are three rubber foot sockets 516 which are fitted with rubber foot pads 313 which frictionally engage the surface on which the blender system rests. A thermoplastic band 322 surrounds the joint between the top shell 302 and the bottom shell 304.

In some embodiments, the thermoplastic of the uppermost portion 316 has an increased coefficient of friction which increases the stability of the jar 111 while mounted on the base 300 to a greater degree. Also increasing stability, while the top surface 316 of the base is rubberized, in some embodiments, it is not removable. Four rubber plugs 780 underneath the blade interfacing connector have been added to lock the top rubberized surface into place.

The interfacing connector 786 of the base 300 with the blade assembly 200 has also been slimmed and reduced to address safety concerns present within the prior art. The interfacing connector 786 of the present invention is a two-shot part component comprised of stainless steel and rubber.

The top shell 302 has a height that may be in a range between 80-120 mm, usually between 100 to 110 mm, and preferably 107 mm. The top shell 302 has hexagonal prismatic shape and a radius along a top flaring in a range between 1-30 mm, usually between 10 to 15 mm, and preferably 11.6 mm. The top shell 302 has a radius from the base flaring in a range between 100-200 mm, usually between 120 to 130 mm, and preferably 124 mm. The top shell 302 has a radius from at a bottom edge flaring in a range between 1-10 cm, usually between 5 to 9 cm, and preferably 7 mm. The interior bottom edge of the top shell 302 has six anchor points for 1.5 mm screws from the bottom shell.

The uppermost portion 316 of the base 300 may have a cover comprised of thermoplastic rubber having a thickness in a range between 1-10 mm, usually between 2 to 4 mm, and preferably 2.5 mm. The cover of the uppermost portion 316 would cover the top of the top shell, and extend the six bosses to 21 mm tall.

A housing bottom shell 304 has a height that is in a range between 10-30 mm, usually between 15 to 20 mm, and preferably 17.5 mm. A housing bottom shell 304 has a hexagonal (long vertices) width that is in a range between 100-210 mm, usually between 120 to 160 mm, and preferably 150 mm. Foot sockets 516 extend from the bottom shell 304 and have a height that is in a range between 1-30 mm, usually between 2 to 20 mm, and preferably 10.5 mm, a width that is in a range between 1-100 mm, usually between 2 to 20 mm, and preferably 12 mm, a length that is in a range between 1-100 mm, usually between 10 to 50 mm, and preferably 31.5 mm, and a wall thickness that is in a range between 1-20 mm, usually between 1.5 to 6 mm, and preferably 2.5 mm.

The thermoplastic band 322 has a height that is in a range between 1-100 mm, usually between 10 to 50 mm, and preferably 18 mm, and a thickness that that is in a range between 0.1-10 mm, usually between 0.5 to 2 mm, and preferably 1 mm.

FIGS. 26-27: User Interface 350

The user interface (motor function control panel) 350 is shown on a front facing wall 301 of the base 300. The user interface 350 includes a motor speed control dial 352, a fuel gauge 364, and several buttons 354, 356, 358, 360, 362 for providing increased control over the functions of the blending system 100. The motor speed control dial 352 has a cover 353 and enables the user to control the speed of the blades 201 during operation to a degree that is not afforded by previous systems. That is, previous blenders typically use dials and can only access five distinct different speeds by the motor. The present system enables and facilitates an infinitely variable speed which is manipulated by the speed control 352. While a wheel dial 352 is shown, other embodiments employ a rotating nob. The wheel 352 is the preferred version of the speed control 352 because users generally find it easier to manipulate with a single digit, rather than a nob which requires at least a two-digit grip. A speed wheel cover 352 sheds water spilled from above.

A power button 358 activates a switch which instructs the PCB 400 to turn the system 100 either on or off. A start/stop button 356 activates a switch which instructs PCB 400 to either start or stop the motor 370 operation. A turbo button 354 activates a switch which instructs the PCB 400 to instruct the motor 370 to operate at its fastest possible speed in a counterclockwise rotation. A pulse button 360 activates a switch which instructs the PCB 400 to instruct the motor 370 to operate in a counterclockwise rotation. Buttons 356, 358 are latching switches and buttons 354, 360, 362 are momentary switches.

A Revopulse™ (auto reverse pulse) button 362 activates a switch which instructs the PCB 400 to instruct the motor 370 to operate in a reversing auto pulse fashion. That is, the blades 101 are instructed to operate in multiple, alternating rotational directions: counterclockwise, clockwise, counterclockwise, clockwise, etc. As previously discussed, the leading edge of the blades 201 are sharper to cut food objects, however the back side of the blade is blunt, and this is better for crushing harder food objects such as nuts. The auto-pulse operation pattern employs both forward and backwards, forward and backwards directions in order to take advantage of both of these features. The present system 100 has a jam sensor and an automatic jam operating response which briefly automatically activates the auto-reverse pulse function to clear the bowl 123 of any jammed food objects.

The lithium-ion battery pack of the present system can blend over 200 servings of 6 oz frozen drinks on a single charge, after which, recharging is possible. The fuel gauge 364 on the user interface 322 is connected to battery sensors and alert the user to the remaining battery life. In the embodiment in FIG. 26, this fuel gauge 364 is embodied by area light LEDs providing a visual indicator of the remaining battery life.

In one embodiment, the fuel gauge 364 is a colored visual indicator and the LEDs are a three-color LEDs. When the battery pack is discharged to 20%, the PCB instructs the two left-most LEDs to shine with an orange light instead of green. When the battery pack is discharged down to 10%, the PCB instructs the left-most LED to shine RED. In other embodiments, the fuel gauge 364 is analog, having a needle move across a dial to indicate a fuel level, or otherwise digital, having a number displaying the precise percentage remaining.

FIGS. 27-28, 32, 33: PCB 400

As shown in FIG. 27, the base 300 contains the motor 762 and elements of the power assembly 700 which are connected to the user interface 350 via a printed circuit board (PCB) 400. The PCB 400 of the present invention may be a flat, non-conductive board with conductive pathways etched or printed onto its surface. The PCB 400 facilitates connection of various electronic components like resistors, capacitors, and integrated circuits by providing a stable base to mount them on and allowing electrical connections between them through the printed pathways, acting as a wiring system within the blender system 100. Not all elements and components of the PCB 400 are shown, those that are shown are only illustrated diagrammatically for reference. However, the size of the PCB 400 is illustrated to scale in order to illustrate the position with respect to the battery pack 701 within the base 300. The potentiometer (a part of the speed control 352) is also illustrated to scale.

The PCB 400 has six metal-oxide-semiconductor field-effect transistors (MOSFETS) 424, voltage-controlled switches, for allowing or blocking the flow of current between two terminals (source and drain) based on the voltage applied to its gate terminal. These six MOSFETs turn the motor's three stator magnets on and off, once each for every revolution of the rotor.

The PCB 400 has a battery management system section (BMS) 406, a dedicated area that houses the electronic components responsible for monitoring and controlling the voltage, current, and temperature of the battery pack, ensuring its safe and efficient operation by preventing overcharging, over-discharging, and overheating.

The PCB 400 has a microcontroller unit section (MCU) 422 containing the central processing unit, memory, and input/output peripherals.

The PCB 400 may also have two barley insulation stickers which may have a 120 mm diameter with 60 mm center hole, battery temp probe wires, plug, male 5 conductor for hall sensors, plug, male five conductor for temp probes, plug, male five conductor for USB wires, ribbon cable for connecting the USB-C port to BMS, socket for USB wires, socket for hall sensor plug, socket for temp probes plug, wire fourteen gauge eighteen volt power to BLDC magnets, wire fourteen gauge for the battery pack to BMS, ribbon cable hall sensors, ribbon cable plug for hall sensors, and a hall sensor wires five conductor.

FIGS. 27-33: Cooling System 500

The present invention 100 has a cooling system 500 comprised of various components which are integrated with other components previously described herein. Specifically, the present invention 100 includes a cooling system 500 for elements within the base 300 including the battery pack 701, some internal components of the motor assembly 760, and the space 501 adjacent the printed circuit board, to reduce, control, and manage the temperature of an interior space 502 of the blender base.

The cooling system includes the raised floor 503 of the base 300, which is elevated above a ground surface level by elongated feet 516. The feet 516 are displaced from one another by thresholds 504. A first threshold 504 enables the air ventilation stream 505 (shown in dotted lines) to enter the entry region 507 of the supply plenum 509. The air ventilation stream 505 enters the supply plenum 509, a part of the volume between the floor 503 of the base 300 and the ground surface which is separated from the return plenum 520 by an air dam 508.

An inclined ramp 511 further raises a portion of the raised floor 503 within the supply plenum 509 and encourages the air ventilation stream 505 to continue upwards until reaching the intake vent 510. The inclined ramp 511 has three portions, a center portion with a volume v=½ (base*height), and two trapezoidal portions with a volume V=½ ((variable base area)*height) where the variable base area of the trapezoidal ramp portions are variable=((side a+side b)/2) *side c)), so that the variable trapezoidal volume is v=½ ((((a+b)/2)*c)*h). This results in an overall increase in the supply plenum volume in a range of between 10 to 50 mL, between 15 and 30 mL and at least 20 mL.

The intake vent 510 typically consists of a vent body or housing 513 with a register or diffuser to control intake, a screen or filter to prevent debris from entering, mounting brackets or clips for installation, sometimes a damper to control airflow, and depending on the design, a cover or grille to protect the opening and potentially adjust airflow direction; in some cases, an intake vent 510 may also include a weatherproof cap to shield it from rain or snow, particularly for outdoor use. The screen or filter may include a mesh-like component to trap dust, leaves, insects, and other particles from entering the intake vent 510.

The cooling system 500 includes an air dam 508 along the floor 503 of the base 300. This interrupts the air ventilation stream 505 along the base 300 and separates the intake and exhaust portions of the air ventilation stream 505. The air dam 508 is positioned at an entry region 507 of the supply plenum 509 to obstruct the flow of air from a exhaust air plenum 520. The air dam 508 creates a positive pressure differential across the raised floor 503 at a substantially constant pressure distribution. In some embodiments, the air dam 508 is 4.0 mm tall×2 mm wall thick and encircles the center cooling air intake louver 510. This separates the intake louver 510 from the four exhaust louvers 512 which encircle the back 75% of the shell bottom 304.

There is an ascending air duct flange 514 encircling the intake louvers 510 that mates with the bottom battery cage air duct flange 522. An internal fan impeller on the shaft of the brushless motor 762 pulls the air ventilation stream 505 through the passages in the grid of the intake louver 510. On the shell bottom interior (not shown) there is a ring 526 molded in around the intake louver 510 that mates with a ring 528 on the bottom of the lower battery cage 522. The interface between these two rings 526, 528 serve to isolate and channel the cooing intake air into the bottom of the motor and to support the battery/motor pack. This forces the air to travel through the air gap of the motor instead of exiting directly through the exit grille 524. The air ventilation stream then passes through the air ducts 506 between the housing and stator, the cooling ducts of the stator, the air gap between the rotor and stator, and the cooling ducts of the rotor (shown diagrammatically in FIG. 31). The air ventilation stream 505 is pushed by the motor fan out of the motor through an exit grille 524 on the motor housing.

The air pressure differential forces the air ventilation stream 505 to be pushed in two directions. A majority volume of the air ventilation stream 505 is pushed into the large PCB duct 501 adjacent the printed circuit board 400. A minority volume of the air ventilation stream 505 is pushed between small battery ducts 703 between the batteries which are enforced by the upper battery cage 706 and lower battery cage 722. The air pressure differential then forces the air ventilation streams 505 to merge once more and be pushed into a housing air duct 527 which exists between the walls 301 of the base 300 and the batteries 702. This air duct 527 leads to a lower shell air duct 529 in the lower shell 304 of the base 300. Finally, the air ventilation stream 505 is pushed out of the exhaust louver 512 and the exhaust plenum 520 between the feet 516. By constantly circulating the air, the internal components of the base 300 are continuously cooled.

FIGS. 27, 28, 31-33: Power Assembly 700

Figure 31:
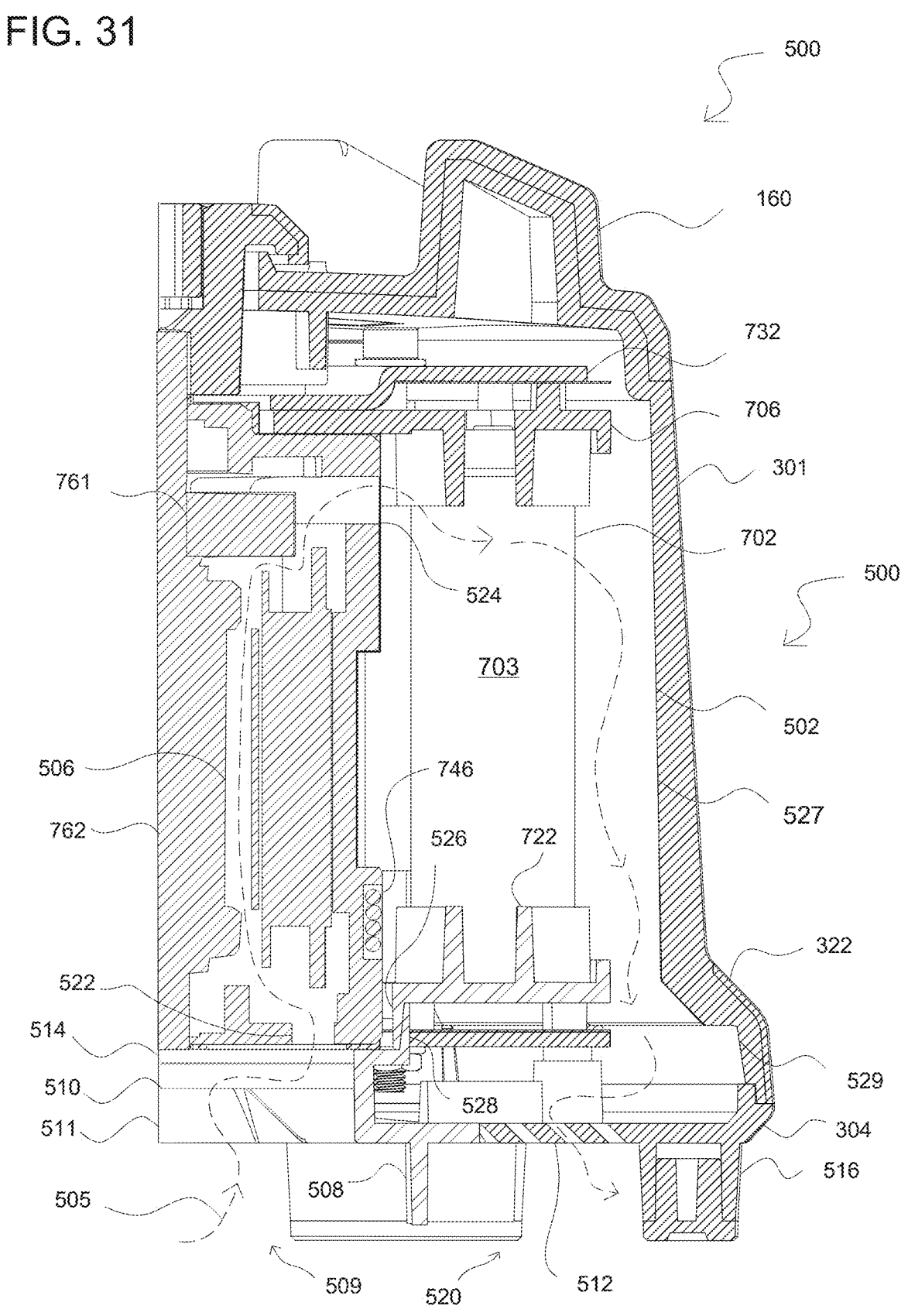
FIG. 31 is a partial cross-sectional view seen from the front, of the base assembly, showing portions of the cooling system according to one embodiment of the present invention.
Figure 32:
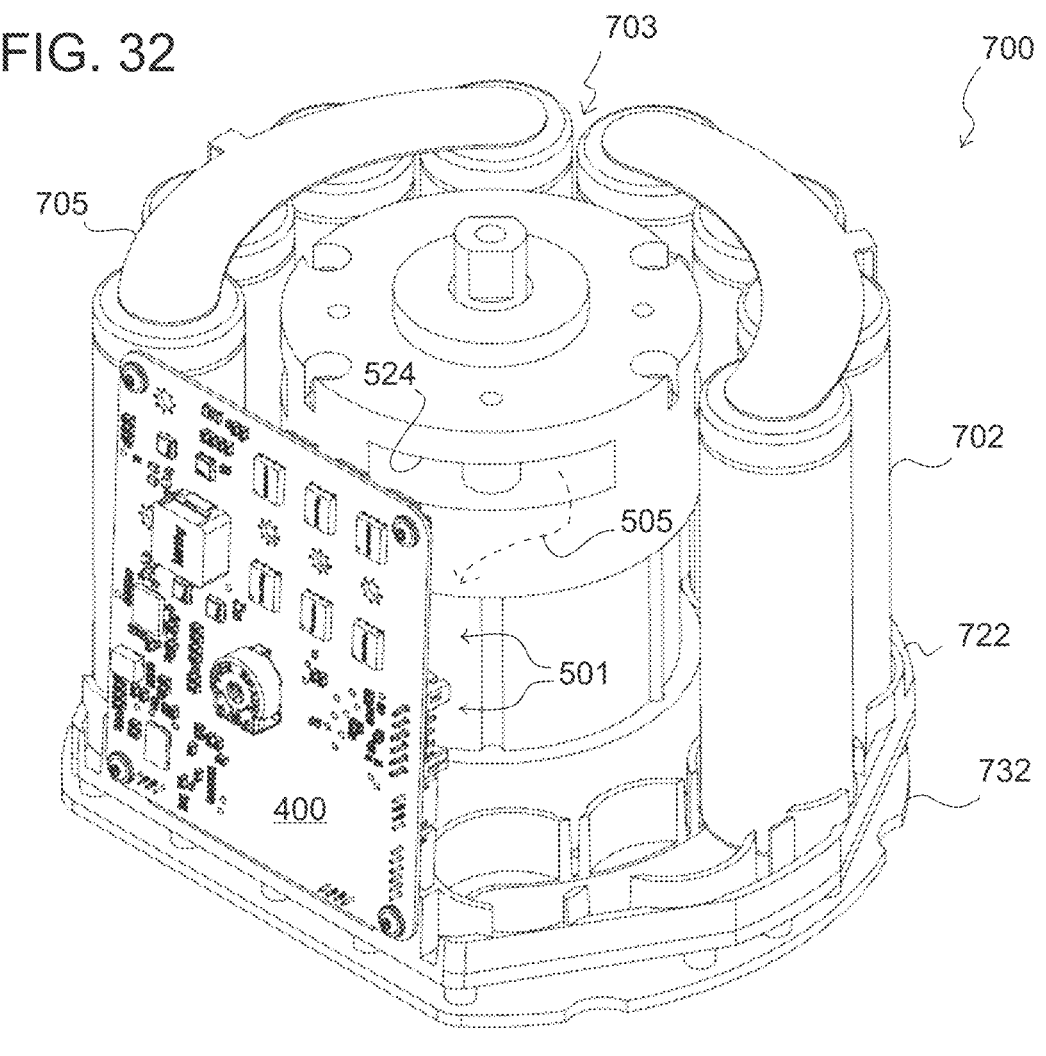
FIG. 32 is top front right perspective view of various internal components of the base assembly, showing a PCB, battery pack (absent two batteries), and portions of the cooling system according to one embodiment of the present invention.
Figure 33:
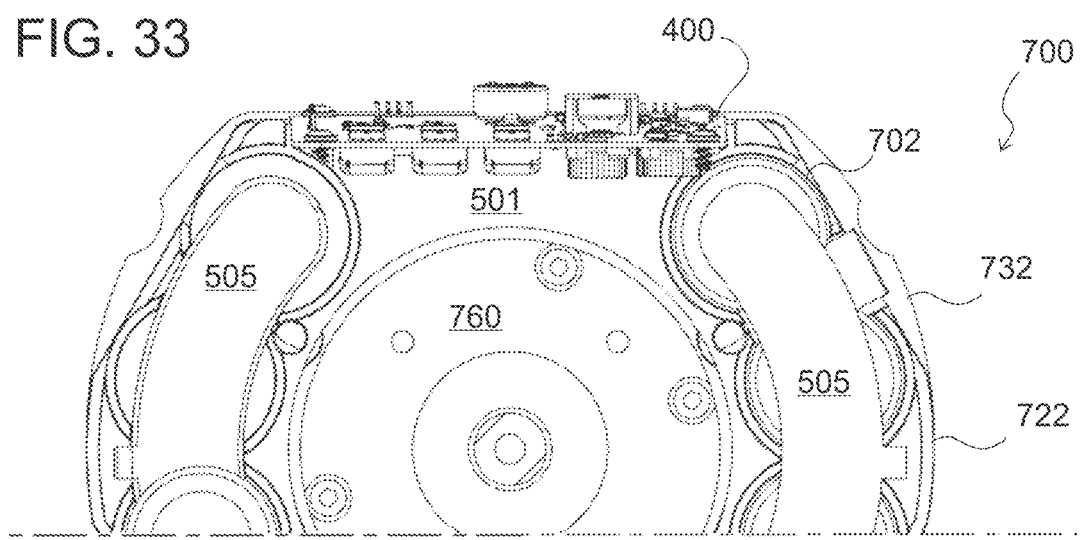
FIG. 33 is top view of various internal components of the base assembly, showing a PCB, battery pack, and portions of the cooling system according to one embodiment of the present invention.

The present system 100 is a blender system 100 that is capable of being used without access to wired/wall/constant-supply of external current such as alternating current. Instead, the present system 100 has a power assembly 700 that has a battery pack 701 that is able to be completely separated from the external sources of power, and, only when necessary, connected to an external source in order to recharge. Various aspects of this power assembly are shown in FIGS. 27, 28, and 31. FIG. 27 illustrates the manner in which the battery cage 722, 706 encloses the batteries 702 which are connected to the user interface 350 via the PCB 400. FIG. 28 removes the top battery cage 706 so that the air channels between the batteries 702, PCB 400, and motor 762 are visible. While FIG. 31 is a partial cross-sectional view focusing on the cooling system 500, this view also affords a closer look at various components of the power assembly 700.

In this embodiment, the battery pack 701 of the power assembly 700 includes ten individual high performance rechargeable battery cells. One example of a suitable battery cell would be the 21700 lithium-ion (Li-Ion) battery cell. The Li-Ion battery's dimensions are 21 mm in diameter and 70 mm in length. These 21700 batteries offer a higher capacity than 18650 batteries and are known for their high energy density, long lifespan, and relatively low self-discharge rate. These batteries are capable of holding 8000 mAh and the maximum discharge of 64 A at 18.5 v DC this results in a system power of 1184 W with a maximum blade speed of 18000 RPM.

The lithium-ion battery pack of the present system can blend over 200 servings of 6 oz frozen drinks on a single full charge, after which, recharging is possible. With standard consumer use, the blender system is capable of running for an average of more than one month on a single charge.

The bottom of the base 300 could be removed to allow replacement of these batteries, however a charger assembly 712 is also available to recharge the batteries when depleted. The USB-C port 718 connects to a USB power cord 704 and USB charger 716 for inputting power to charge the blender's battery pack 701. The USB-C port 718 is also capable of connecting to a USB-C cord 704 for outputting power from the battery pack to charge phones, etc., That is, the USB-C port is bi-directional and in conjunction with the BMS system can be used to charge cell phones and other devices that take a 5 VDC charging current.

The power supply may be 120-240V, 150 W 22 v with a 3-prong plug. The power cord may be between 0.2 and 3 meters. The converter may be an AC plug with 3 prongs or a 22 v DC plug compatible with DC socket.

The battery top cage 706 has ten flanges to constrain each of the tops of the batteries 702, leaving small spaces between each of the batteries. The top battery cage 706 is depressed in the center with channels for wiring. Fasteners such as screws 772 hold the whole battery pack together. The heads of the screws 772 push against the upper steel plate 731. Mechanically then, the fasteners 772, the upper steel plate 731, and the lower steel plate, hold the whole battery pack assembly together. The top of the motor sits against the bottom of the upper steel plate and the screws 774 hold the motor and battery pack to the top of the base housing. The battery pack is also supported by the shell bottom 304.

True max power for the system, activated by the turbo button, is limited by the max amp draw on the battery pack, usually about 1184 W. In this embodiment the top speed wheel power setting is 740 W. The turbo button activates only intermittent use, and requires that the user maintain activation by depressing the button. Contrary to this, the start/stop button is a latch switch. A single push is all that is required to turn on the system, while a single push while the system is on will then turn the system off. Power to the start/stop button is limited to avoid overheating the MOS-FETs.

In one embodiment, barley insulation stickers are no longer needed due to a redesign of the jumpers that connect all the batteries to each other and the BMS on the PCB. On a second line, there are three temp probe wires 26 AWG insulated connected to thermocouples mounted between six of the 21700 cells. There are four wires, 26AWG insulated that monitor the voltage of the 21700 cells, allowing the BMS to detect uneven charge and discharge voltage of individual pairs of cells. In this embodiment, there are no longer channels for jumper wiring. Instead, jumpers 705 are flat, 0.30 mm nickel strips 705. Thin nickel strips 705 lay flat to the battery ends entirely under the respective cages 706, 722.

FIGS. 27, 28, 31-33: Motor Assembly 760

The brushless motor is also portrayed within the base only conceptually, and not all elements of the brushless motor are illustrated. FIG. 27 illustrates the manner in which the motor shaft 782 exits through the center of the upper steel plate 784. FIG. 28 removes the top battery cage 706 so that the air channels between the batteries 702, PCB 400, and motor 762 are visible. While FIG. 31 is a partial cross-sectional view focusing on the cooling system 500, this view also affords a diagrammatic view of various components of the motor 762. The motor 762 of the current system is a modified brushless direct current motor (BDCM) 18.5 v DC, 2,400 watt, and capable of 18,000 rpm. The nominal voltage is 22.5 v. The motor has an internal fan 761 that may have a fan blade height of that is in a range between 1-100 mm, usually between 2 to 20 mm, and preferably at least 8 mm.

Three longer machine screws 772 for securing the battery pack 701 are visible from the top of the upper steel plate 731. The top of the four smaller motor mounting screws 782 are also visible at the top of the upper steel plate 731.

The motor 762 is positioned within the middle of the battery pack 701. It has an interior fan which draws air in from the bottom of the base and expels the air out of slots at the top of the fan. Air in the plenum between the motor and batteries is pushed outward due to changes in pressure to pass between small gaps present between batteries. Air is also forced to pass in the volume across the PCB, cooling all of the PCB components which are discussed in greater detail with respect to the cooling system of the present invention below. Air then passes between the batteries and the blender housing, traveling down and out of the exhaust vents.

Brushless motors in the prior art are commonly subject to overheating which can cause mechanical failure. This often occurs because friction between the rotor and stator components within the motor generate heat. The present system uses a modified motor having an interior fan with increased blade fan height, increased ventilation, and altered overall height, modified housing, and an altered cable positioning. The modified motor uses rare earth neodymium magnets and has an output that is levels of magnitudes higher than other commercially available motors, which as a result, runs extremely efficiently, and is capable of running for over a month between charges for normal home use.

LIST OF REFERENCED ELEMENTS

Components of the present system are listed below with the associated reference numbers which are adhered to within the specification and the associated drawings of the present application.

100 portable blender system
109 profile (sliced)
110 jar assembly
111 body
112 spout
113 walls of ribs
114 ribs set
115 ribs set
116 enlarged neck
117 handle
118 walls
119 corners
120 interior portion 121 first portion
122 intervening portion
123 bowl portion
124 hole
125 vortex
126 agitation pattern
127 ingress
128 flat portion
130 measuring cup
131 walls
132 cavity
133 volume marks
134 volume marks, ml
135 locking tabs
137 grip flange
138 seal flange
140 lid
141 locking notch
142 lip
143 hiatus
144 inset
145 ramp
146 slanted roof
147 wall
148 lid sealing flange
149 aperture
150 joining assembly
152 skirt
154 wall
155 top
156 rim
157 vertices
158 interior portion
160 bosses
162 exterior walls
164 radial walls
166 exterior vertex
169 interior facing wall
200 whole blade assembly
201 blades
202 circlip
203 screw,
204 drive shaft
206 housing
208 male coupler fitting
210 screw
212 washer
214 lip seal
215 threaded
216 bearing for shaft
218 gasket, food grade
220 nut
300 base
301 walls
302 shell, top
304 shell, bottom
306 screws,
308 screws,
313 rubber pads
314 screws,
316 top of blender base
317 top shoulder
318 USB-C port
322 curb
350 user interface
352 motor speed control dial
353 cover 354 turbo switch
356 motor activation switch
358 power on/off switch
360 pulse switch
362 Revopulse™ switch
364 fuel gauge 364
400 printed circuit board (PCB)
402 motor control section
406 BMS
408 barley insulation stickers
410 battery temp probe wires
420 machine screw coupler retainer
422 MCU
424 MOSFETS
428 male 5 conductor for hall sensors
430 male 5 conductor for temp probes
432 male 5 conductor for USB wires
436 ribbon cable USB-C port to BMS
438 socket for USB wires
440 socket for hall sensor plug
442 socket for temp probes plug
448 wire 14 gauge to BLDC magnets
450 wire battery pack to BMS PCB
454 conductor
500 cooling system
501 space next to PCB
502 interior spaces of base 300
503 raised floor
504 thresholds between feet
505 ventilation stream
506 duct for cool air
507 entry region
508 air dam
509 supply plenum
510 intake louver
511 ramp
512 exhaust air vents
513 filter
514 ascending air duct flange
516 feet
520 return plenum
522 air duct flange
524 exit grill on motor
526 ring
528 ring 2
530 PCB duct
700 power assembly
701 battery pack
702 batteries
703 battery air duct
704 power cord, USB-C
705 jumper strip
706 cage, upper battery cage
716 converter
722 cage, lower battery cage
724 fish paper
726 rigid plastic tubes
728 battery pack screws
730 machine screw
732 steel plate lower
734 battery charge sensor wires
746 six sensor wires
747 wires between the battery cells
760 motor assembly
762 motor
764 housing
766 gasket

768 holes
770 nut
772 screws, long
774 screws, mounting
776 ribbon cable hall sensors
778 ribbon cable plug
780 coating
782 shaft
784 steel plate, upper
786 coupler
787 female coupler socket

CONCLUSION

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A portable blender system for dicing, blending, and pulverizing food and liquid, the portable blender system comprising:
    a jar having an interior portion with an interior volume of at least 2.5 qt, a first opening, and a second opening;
    a lid capable of releasable engagement with the first opening of the jar;
    a base capable of interlocking engagement with the second opening of the jar, the base having a motor capable of 18,000 rpm;
    a battery pack within the base for powering the portable blender system, the battery pack having a first battery adjacent a second battery; and
    a detachable power cord for recharging the battery pack;
    a cooling system capable of providing an air ventilation stream through an air passage extending between the first battery and the second battery;
    wherein the portable blender system having a first working configuration in which the jar is positioned on the base; and
    wherein the portable blender system having a second storage configuration in which the base and the detachable power cord are completely enclosed within the interior portion of the jar.

2. The portable blender system of claim 1 wherein the portable blender system in the first working configuration has a first volume, and portable blender system in the second storage configuration has a second volume, and a ratio of size of the first volume to the second volume is at least 1.2 to 1.

3. The portable blender system of claim 1 wherein the portable blender system in the first working configuration has a first volume, and the portable blender system in the second storage configuration has a second volume, and a ratio of size of the first volume to the second volume is at least 1.6 to 1.

4. The portable blender system of claim 1 wherein the first battery is the first battery of a plurality of batteries of the battery pack, and the second battery is a second battery of the plurality of batteries, the plurality of batteries is connected in series so the battery pack is capable of holding 8000 mAh with a maximum discharge of 64 A at 18.5v DC to provide the motor with a power of 1184 W with a maximum blade speed of 18000 RPM.

5. The portable blender system of claim 1 wherein the motor further comprising a modified 18.5v, 2,400 W, brushless direct current motor having a nominal voltage of 22.5v.

6. The portable blender system of claim 1, wherein the jar having a hollow body with a first portion having a circular profile, a second portion having a profile with at least six sides, and a third portion having a circular profile.

7. The portable blender system of claim 1, wherein the jar having a hollow body with a first portion having a circular profile, a second portion having an octadecagon profile, and a third portion having a circular profile.

8. The portable blender system of claim 1, wherein the lid having a first sealing ring and a second sealing ring extending radially from a vertical wall of the lid, wherein the first sealing ring having a first perforation, wherein the second sealing ring having a second perforation, and wherein the first sealing ring being radially disparate from the second sealing ring such that the first sealing ring perforation and the second sealing ring perforation are staggered from one another.

9. The portable blender system of claim 1, wherein the cooling system having an intake vent, an air duct extending through the base, and an exhaust vent.

10. The portable blender system of claim 1, further comprising a printed circuit board for controlling the portable blender system, wherein the cooling system capable of providing an air ventilation stream through an air duct adjacent the printed circuit board.

11. The portable blender system of claim 1, wherein the cooling system having an intake louver, an exhaust louver, an air duct extending through the base between the intake louver and the exhaust louver, and an air dam separating an intake plenum adjacent the intake louver from an exhaust plenum adjacent the exhaust louver.

12. The portable blender system of claim 11, wherein the cooling system further comprising a raised floor of the base, the raised floor being elevated by elongated feet connected to the air dam; the elongated feet and connected air dam separating the intake plenum from the exhaust plenum.

13. The portable blender system of claim 1, wherein the cooling system having an intake louver, an exhaust louver, an air duct extending through a first portion and a second portion of the base between the intake louver and the exhaust louver, a first ring extending around a perimeter of the first portion, a second ring extending around an inner perimeter of the second portion, wherein the first ring and the second ring abut against one another and prevent air flow from the second portion to the first portion.

14. The portable blender system of claim 1, wherein the cooling system further comprising: a raised floor of the base and an inclined ramp of the base, the raised floor being elevated by elongated feet of the base, and the inclined ramp further raising a portion of the raised floor of the base; wherein together the raised floor and the inclined ramp increasing a supply plenum by at least 20 mL.

15. The portable blender system of claim 1, wherein the cooling system further comprising: an internal fan impeller having a height of at least 8 mm, the internal fan capable of pulling an air ventilation stream upwards from an intake louver through the motor, and pushing the air ventilation stream outwards through an exit grille on a top of the motor.

16. A portable blender system for dicing, blending, and pulverizing food and liquid, the portable blender system comprising:
    a jar assembly with a jar body having an interior portion with an interior volume of at least 2.5 qt, a first opening, and a second opening;

a base assembly supporting the jar assembly when the portable blender system is in a first configuration;

a joining assembly which reversibly secures the base assembly and jar assembly in the first configuration of the portable blender system;

a blade assembly which reversibly and matingly engages the interior portion of the jar assembly, the blade assembly capable of dicing, blending, and pulverizing the food and liquid within the jar body when the portable blender system is in the first configuration;

a power assembly for powering the portable blender system, the power assembly including a rechargeable battery pack having at least a first battery, a second battery, and a detachable power cord for powering the portable blender system;

a cooling system capable of providing an air ventilation stream through an air passage extending between the first battery and the second battery; and a second storage configuration in which the base assembly and the power assembly are completely enclosed within the interior portion of the jar body;

wherein the portable blender system in the first configuration has a first volume, the portable blender system in the second configuration has a second volume, and a ratio of size of the first volume to the second volume is at least 1.2 to 1.

17. The portable blender system of claim 16 wherein the second storage configuration of the portable blender system has the base assembly completely enclosed within the interior portion of the jar body; wherein the portable blender system in the first configuration has the first volume, and the portable blender system in the second configuration has the second volume, and the ratio of size of the first volume to the second volume is at least 1.6 to 1.

18. The portable blender system of claim 16 wherein the second storage configuration of the portable blender system has the base assembly, the blade assembly, and the power assembly all completely enclosed within the interior portion of the jar body.

19. The portable blender system of claim 16, wherein the second storage configuration of the portable blender system has the base completely enclosed within the jar; wherein the first configuration has the first volume of the portable blender system, and the second configuration has the second volume of the portable blender system, and the ratio of size of the first volume to the second volume is at least 1.4 to 1.

\* \* \* \* \*